(12) United States Patent
Utsumi

(10) Patent No.: US 6,904,884 B2
(45) Date of Patent: Jun. 14, 2005

(54) BALANCE DEVICE FOR ENGINES

(75) Inventor: Yoji Utsumi, Shizuoka-ken (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/477,500

(22) PCT Filed: Feb. 19, 2003

(86) PCT No.: PCT/JP03/01823
§ 371 (c)(1),
(2), (4) Date: Jun. 10, 2004

(87) PCT Pub. No.: WO03/071157
PCT Pub. Date: Aug. 28, 2003

(65) Prior Publication Data
US 2004/0206327 A1 Oct. 21, 2004

(30) Foreign Application Priority Data
Feb. 20, 2002 (JP) ........................................ 2002-043831

(51) Int. Cl.⁷ .............................................. F02B 75/06
(52) U.S. Cl. .................................................... 123/192.2
(58) Field of Search ..................................... 123/192.2

(56) References Cited

U.S. PATENT DOCUMENTS

| | | |
|---|---|---|
| 5,038,731 A | 8/1991 | Shimada |
| 5,218,885 A * | 6/1993 | Nakano et al. ............. 123/192.2 |
| 6,067,950 A | 5/2000 | Kinoshita et al. |

FOREIGN PATENT DOCUMENTS

| | | |
|---|---|---|
| JP | 61-106647 | 7/1986 |
| JP | 63-23044 | 1/1988 |
| JP | 2-113145 | 4/1990 |
| JP | 8-100836 | 4/1996 |
| JP | 2000-27888 | 1/2000 |

* cited by examiner

Primary Examiner—Noah P. Kamen
(74) Attorney, Agent, or Firm—Hogan & Hartson, LLP

(57) ABSTRACT

A balancer device for engines, in which first and second balancer shafts are arranged in parallel to a crankshaft and the crankshaft rotatingly drives first and second balancer weights at the same speed as that of the crankshaft, characterized in that the first balancer weight is arranged on one end of the first balancer shaft in a direction along the crankshaft, the second balancer weight is arranged on the other end of the second balancer shaft in the direction along the crankshaft, and the first and second balancer shafts are made close to the crankshaft so that loci of rotation of the first and second balancer weights partially overlap a locus of rotation of that portion of the crankshaft, which is coupled to a conrod when viewed in the direction along the crankshaft.

9 Claims, 22 Drawing Sheets

LEFT SIDE AS VIEWED

LEFT SIDE AS VIEWED

RIGHT SIDE AS VIEWED

RIGHT SIDE AS VIEWED

LEFT SIDE AS VIEWED

VIEWED FROM ARROW A

BALANCE DEVICE FOR ENGINES

TECHNICAL FIELD

The present invention relates to a balancer device for engines, comprising two balancer shafts.

BACKGROUND ART

In order to prevent generation of uncomfortable vibrations in an engine, a balancer device for engines is in some cases adopted, in which first and second balancer shafts are arranged in parallel to a crankshaft and the balancer shafts are reversely rotated at the same speed as that of the crankshaft.

With the conventional two-axis type balancer devices, there are some cases, in which surroundings of a crankcase become large in size and hindrance is caused in weight balance of a vehicle according to the arrangement and structure of balancer shafts, and there is a fear of causing problems, such as structural complication, an increase in the number of parts, degradation in assembling quality, loss in engine output, or the like.

The invention has been thought of in view of the above conventional problems, and has its object to provide a balancer device for engines, which can prevent large-sizing of surroundings of a crankcase, eliminates hindrance in weight balance, and can avoid problems, such as structural complication, an increase in the number of parts, degradation in assembling quality, loss in engine output, or the like.

DISCLOSURE OF THE INVENTION

The invention provides a balancer device for engines, in which first and second balancer shafts are arranged in parallel to a crankshaft and the crankshaft rotatingly drives first and second balancer weights at the same speed as that of the crankshaft. The first balancer weight is arranged on one end of the first balancer shaft in a direction along the crankshaft The second balancer weight is arranged on the other end of the second balancer shaft in the direction along the crankshaft. The first and second balancer shafts are made close to the crankshaft so that loci of rotation of the first and second balancer weights partially overlap a locus of rotation of that portion of the crankshaft, which is coupled to a conrod when viewed in the direction along the crankshaft.

The invention includes a feature that both sides of that portion of the crankshaft, which is coupled to the conrod, are born through first and second journal bearings by side walls of a crank chamber. The first and second balancer weights are rotatably supported by the first and second balancer shafts, and balancer driven gears formed on the first and second balancer weights mesh with crank drive gears, which are arranged close to and outside the first and second journal bearings.

The invention provides a balancer device for engines, in which first and second balancer shafts are arranged in parallel to a crankshaft and the crankshaft rotatingly drives first and second balancer weights at the same speed as that of the crankshaft. The first and second balancer shafts serve as coupling bolts for a left and right split type crankcase, and the first and second balancer weights are rotatably supported by the first and second balancer shafts.

The invention includes a feature that the first balancer weight is arranged on one end of the first balancer shaft in a direction along the crankshaft. The second balancer weight is arranged on the other end of the second balancer shaft in the direction along the crankshaft. The first and second balancer shafts are made close to the crankshaft so that loci of rotation of the first and second balancer weights partially overlap a locus of rotation of that portion of the crankshaft, which is coupled to a conrod when viewed in the direction along the crankshaft.

The invention includes a feature that both sides of that portion of the crankshaft, which is coupled to the conrod, are born through first and second journal bearings by side walls of a crank chamber. The balancer driven gears formed on the first and second balancer weights mesh with crank drive gears, which are arranged close to and outside the first and second journal bearings.

The invention includes a feature that the first and second balancer shafts comprise weight supports for supporting the first and second balancer weights, and crankcase-interior portions are arranged adjacent to the crankshaft. The crankcase-interior portions are formed to have a smaller diameter than that of the weight supports.

The invention includes a feature that oil introduction passages are formed on the first and second balancer shafts to communicate the crank chamber and balancer-weight bearing portions to each other.

The invention includes a feature that axes of rotation of the first and second balancer driven gears are made eccentric from axes of the first and second balancer shafts, and the first and second balancer shafts are rotated to thereby enable regulating backlash between the first and second balancer driven gears and the first and second crank drive gears.

The invention includes a feature that backlash regulation mechanisms are provided on the same end sides of the first and second balancer shafts in the direction along the crankshaft.

The invention includes a feature that the first and second crank drive gears comprise a ring-shaped gear portion arranged around a disk-shaped base portion fixed to the crankshaft to be rotatable relative thereto and have teeth to mesh with the balancer driven gears, and U-shaped buffer springs are interposed between the gear portion and the base portion.

BEST MODE FOR CARRYING OUT THE INVENTION

Figure 1:
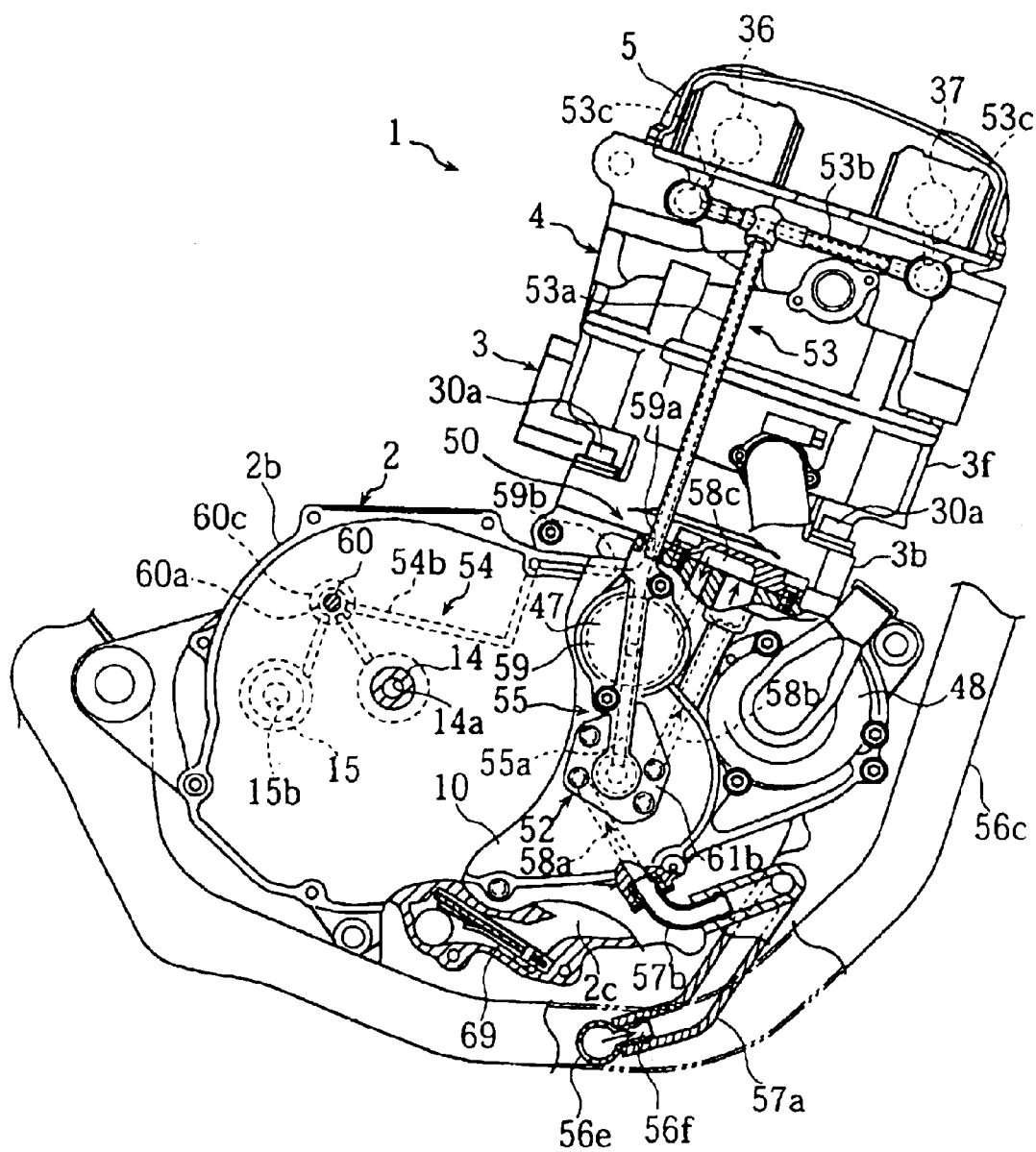
FIG. 1 is a right side view showing an engine according to an embodiment of the invention.
Figure 2:
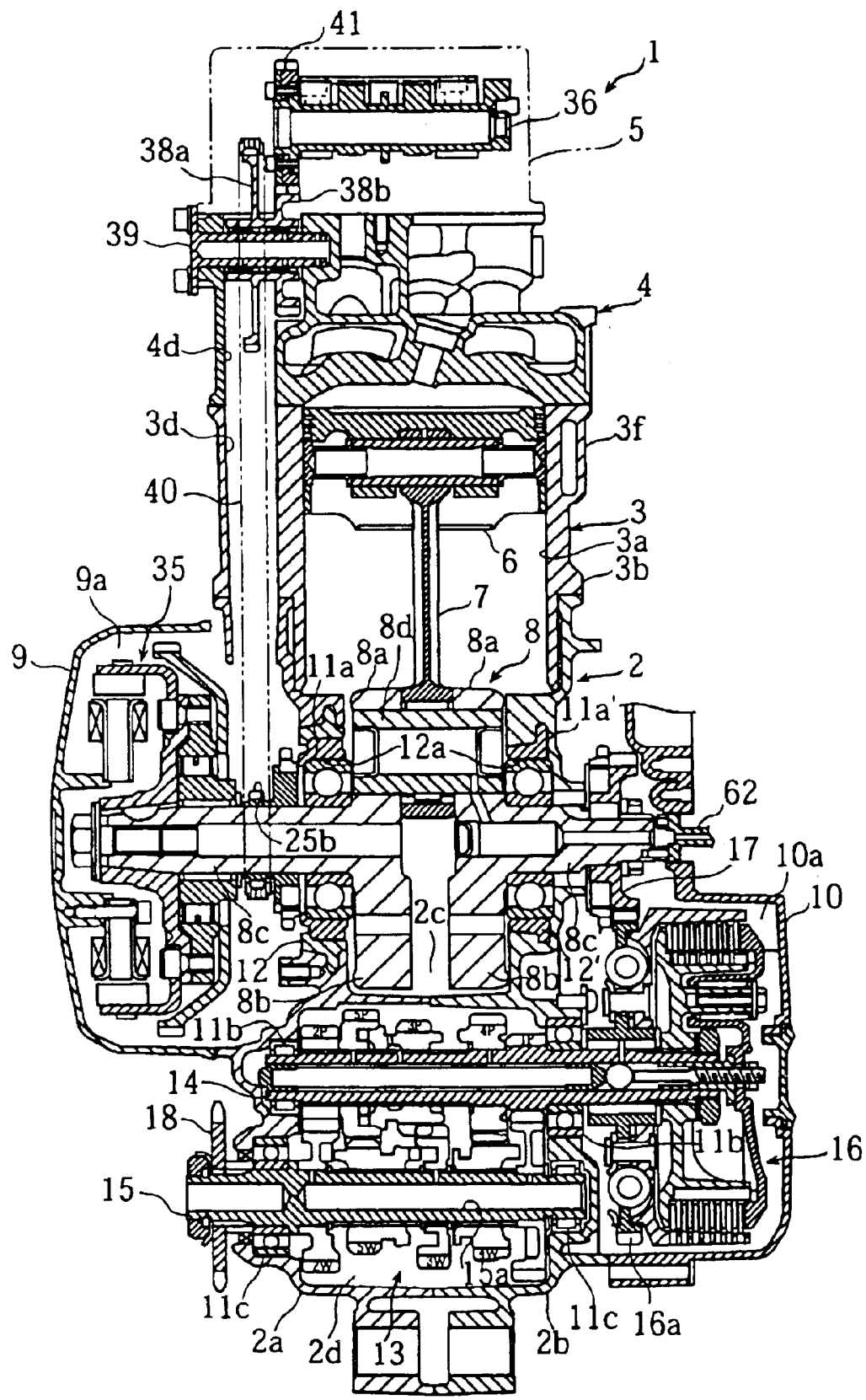
FIG. 2 is a planar development of a cross section of the engine.

An embodiment of the invention will be described below with reference to the accompanying drawings.

FIGS. 1 to 21 illustrate a balancer device for engines, according to an embodiment of the invention.

In the drawings, the reference numeral 1 denotes a water-cooling type 4-cycle single-cylinder five-valve engine, the engine having a general construction, in which a cylinder body 3, a cylinder head 4, and a head cover 5 are stacked and clamped to one another on a crankcase 2 and a piston 6 arranged slidably within a cylinder bore 3a of the cylinder body 3 is connected to a crankshaft 8 through a conrod 7.

The cylinder body 3 and the crankcase 2 are coupled to each other by screwing four case bolts 30a, which extend through a lower flange (case-side flange) 3b, into a cylinder-side mating surface 2e of the crankcase 2. More concretely, the case bolts 30a are threaded into bolt-coupling portions (coupling boss portions) 12c of iron-alloy bearing brackets 12, 12' (described later), which are embedded into left and right walls of the crankcase 2 of aluminum alloy by insert-casting. In addition, the reference numeral 31a denotes dwell pins for positioning of the crankcase 2 and the cylinder body 3.

Also, the cylinder body 3 and the cylinder head 4 are coupled to each other by means of two short head bolts 30b and four lengthy head bolts 30c. The short head bolts 30b are threadedly implanted into a lower portion of an intake port 4c of the cylinder head 4 and a lower portion of a discharge port to extend downward to extend through an upper flange 3f of the cylinder block 3 to project downward. By screwing cap nuts 32a onto lower projecting portions of the short head bolts 30b, the upper flange 3f and hence the cylinder body 3 are clamped to a cylinder-side mating surface 4a of the cylinder head 4.

Also, the lengthy head bolts 30c are threadedly implanted into the lower flange 3b of the cylinder body 3 to extend upward to extend through a flange 4b of the cylinder head 4 from the upper flange 3f of the cylinder body 3 to project upward. By screwing cap nuts 32b onto upper projecting portions of the lengthy head bolts 30c, the lower flange 3b and hence the cylinder body 3 are clamped to the cylinder-side mating surface 4a of the cylinder head 4.

In this manner, at the time of coupling the cylinder body 3 and the cylinder head 4 to each other, not only the upper flange 3f of the cylinder body 3 is clamped and fixed to the cylinder head 4 by means of the short head bolts 30b and the cap nuts 32a, but also the lengthy head bolts 30c are implanted into the lower flange 3b, which is bolted and coupled to the mating surface 2e of the crankcase 2, and the lengthy head bolts 30c and the cap nuts 32b are used to clamp and fix the cylinder body 3 to the flange 4b of the cylinder head 4, whereby the cylinder body 3 and the four lengthy head bolts 30c bear a tension load produced by combustion pressure and it is possible to correspondingly reduce a load acting on the cylinder body 3. As a result, it is possible to decrease stresses generated especially in an axially intermediate portion of the cylinder body 3, thus enabling ensuring durability even in the case where the cylinder body 3 is decreased in wall thickness.

Incidentally, in the case where only the upper flange 3f of the cylinder body 3 is coupled to the cylinder head 4, an excessive tension stress is generated in the axially intermediate portion of the cylinder body 3, and in extreme cases, there is a fear of cracks being generated in the portion, while according to the embodiment the presence of the lengthy head bolts 30c can avoid generation of such excessive tension stress in the intermediate portion of the cylinder body, thus enabling preventing generation of cracks.

Also, at the time of implanting the lengthy head bolts 30c into the lower flange 3b, the lengthy head bolts 30c are arranged in the vicinity of the case bolts 30a for clamping of the crankcase, whereby the load produced by combustion pressure can be surely transmitted to the crankcase 2 through the lengthy head bolts 30c and the cylinder body 3 from the cylinder head 4, which enables improving durability against the load.

Figure 5:
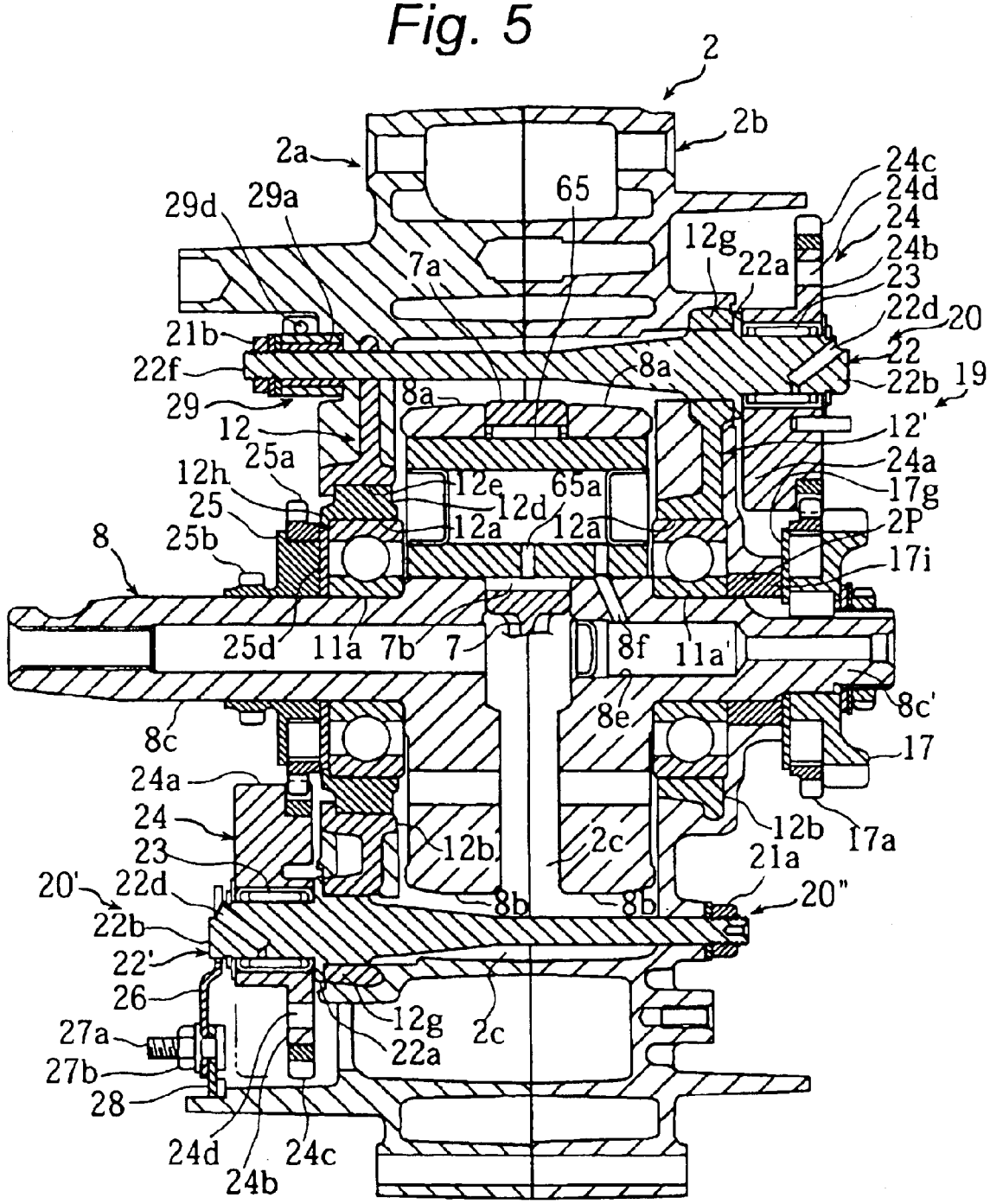
FIG. 5 is a planar development of a cross section showing a balancer device of the engine.
Figure 6:
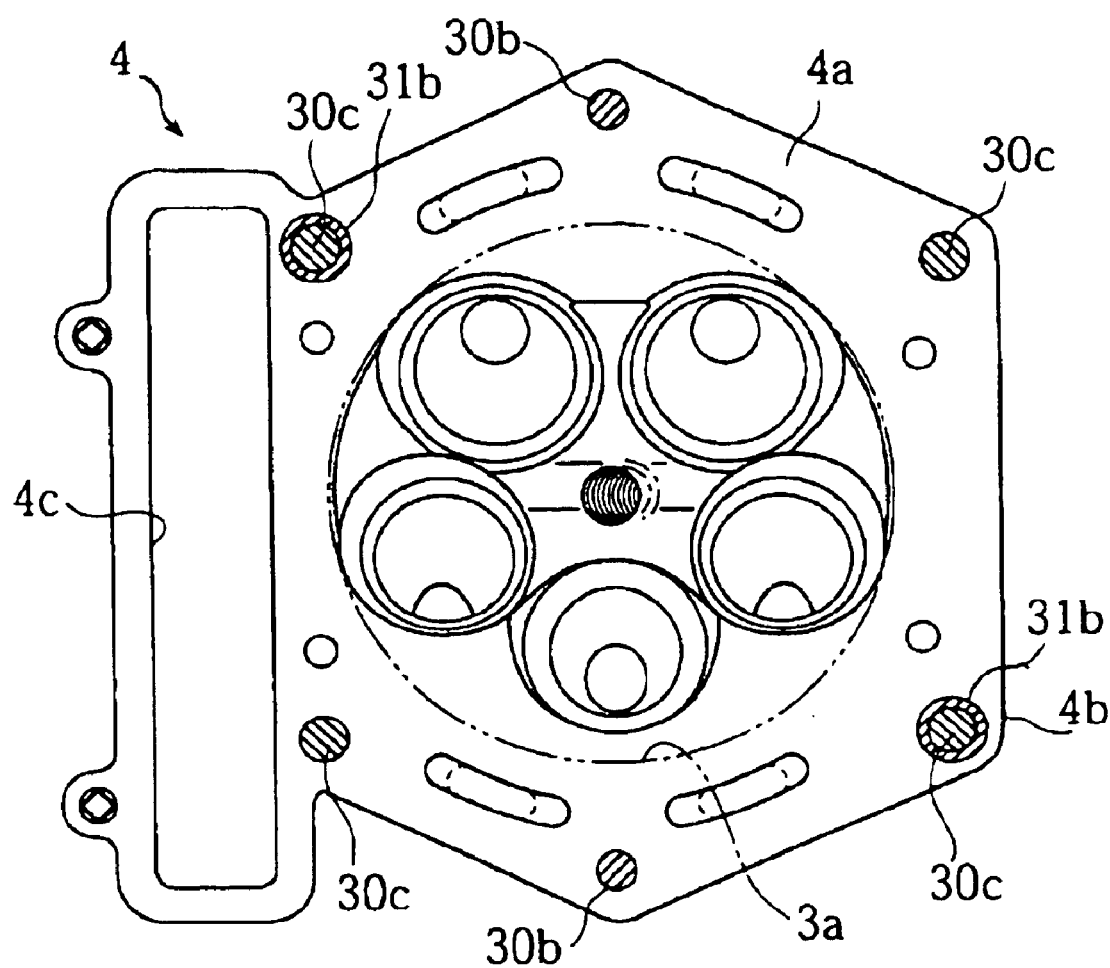
FIG. 6 is a bottom view showing a cylinder head of the engine.
Figure 7:
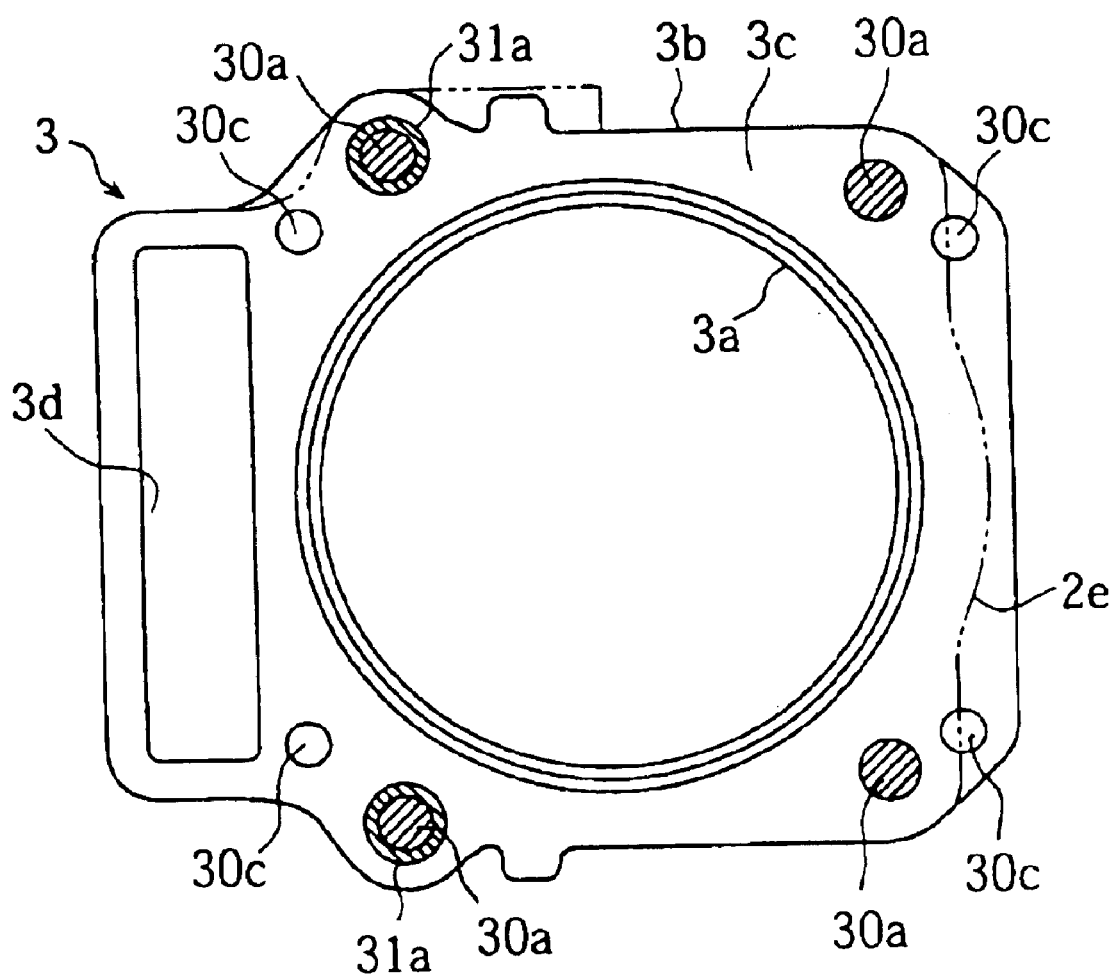
FIG. 7 is a bottom view showing a cylinder body of the engine.
Figure 8:
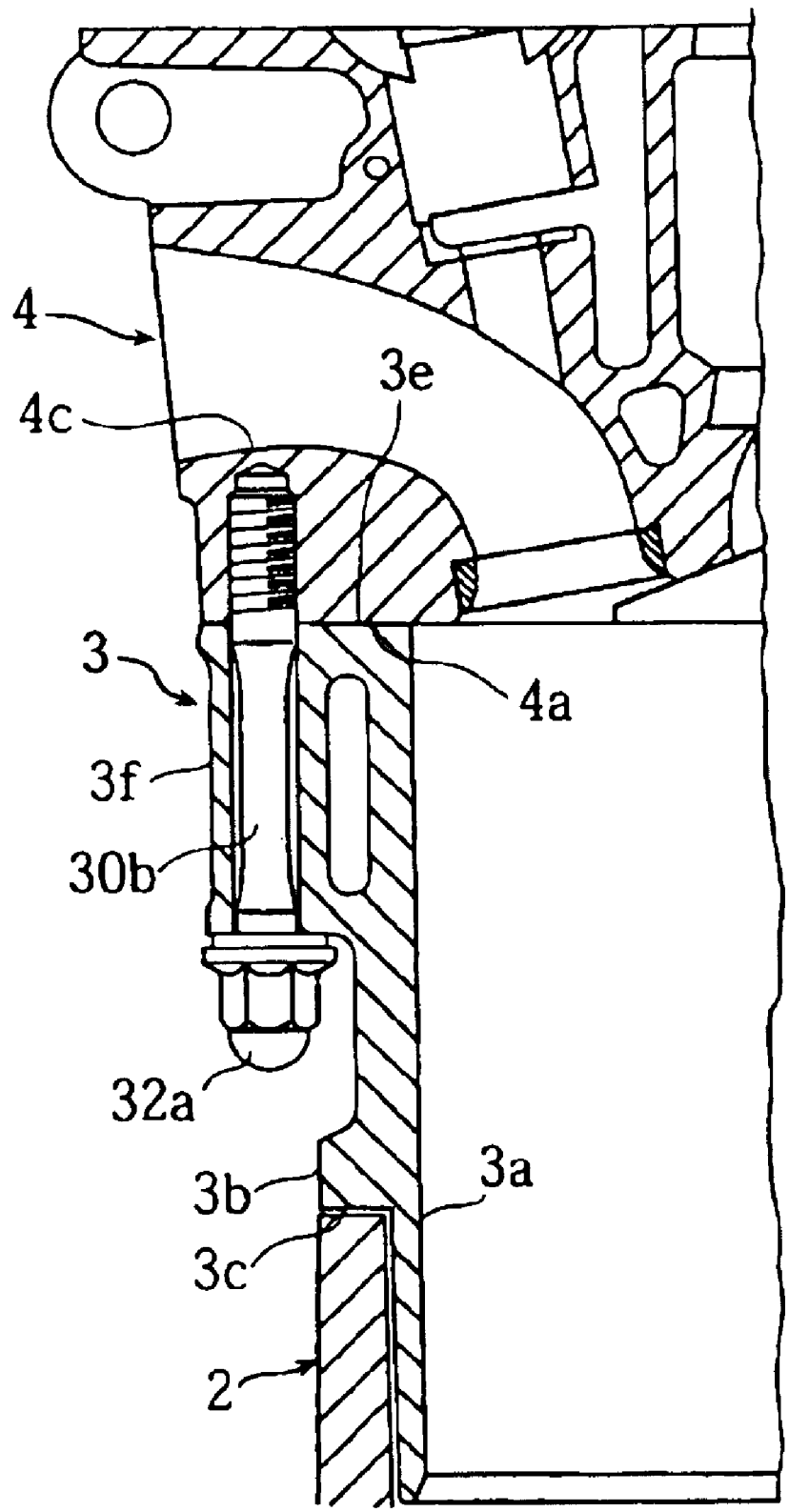
FIG. 8 is a cross sectional side view showing a connection of the cylinder head and the cylinder body of the engine.
Figure 9:
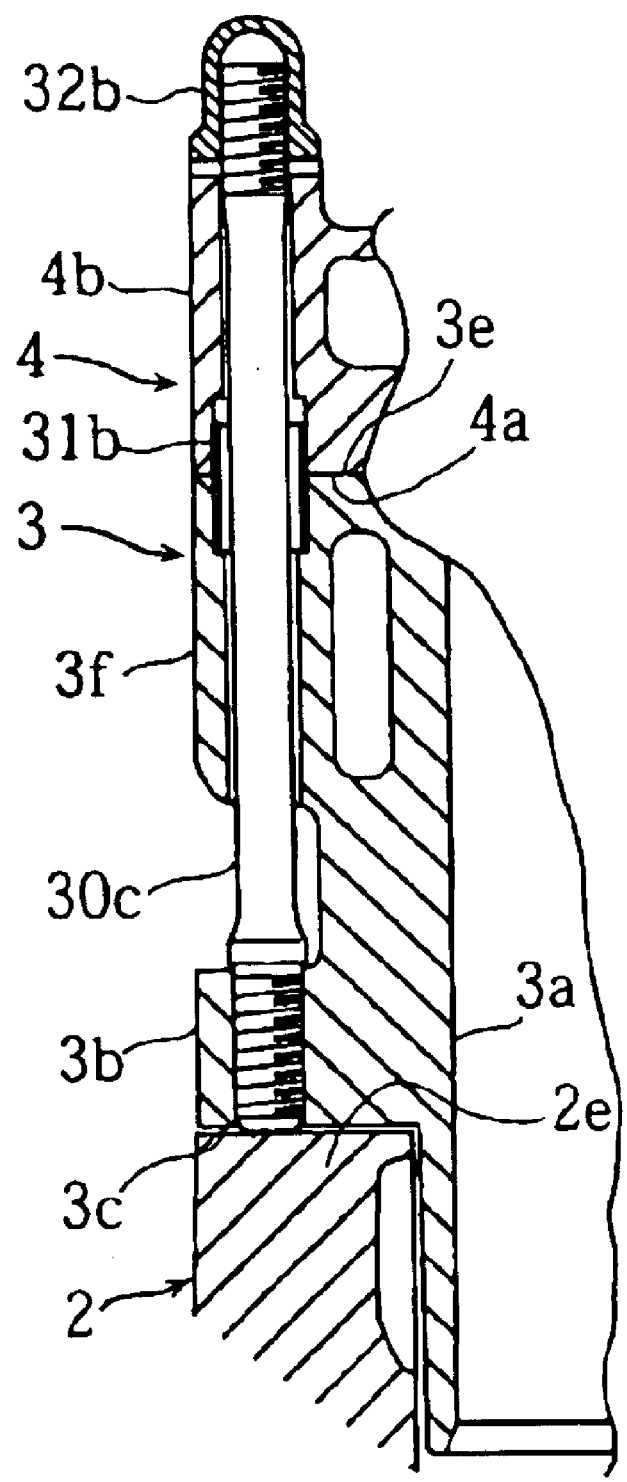
FIG. 9 is across sectional side view showing a connection of the cylinder head and the cylinder body of the engine.
Figure 10:
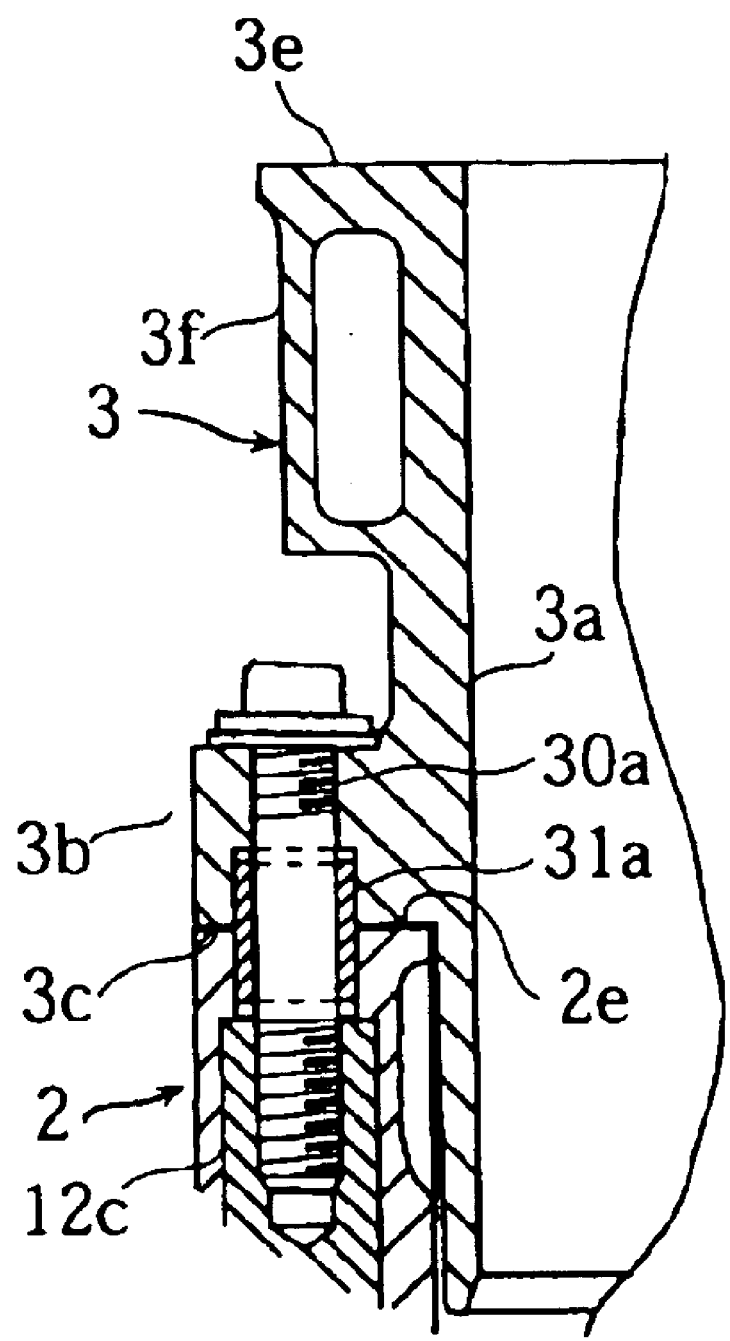
FIG. 10 is across sectional side view showing a connection of the cylinder body and a crankcase of the engine.
Figure 16:
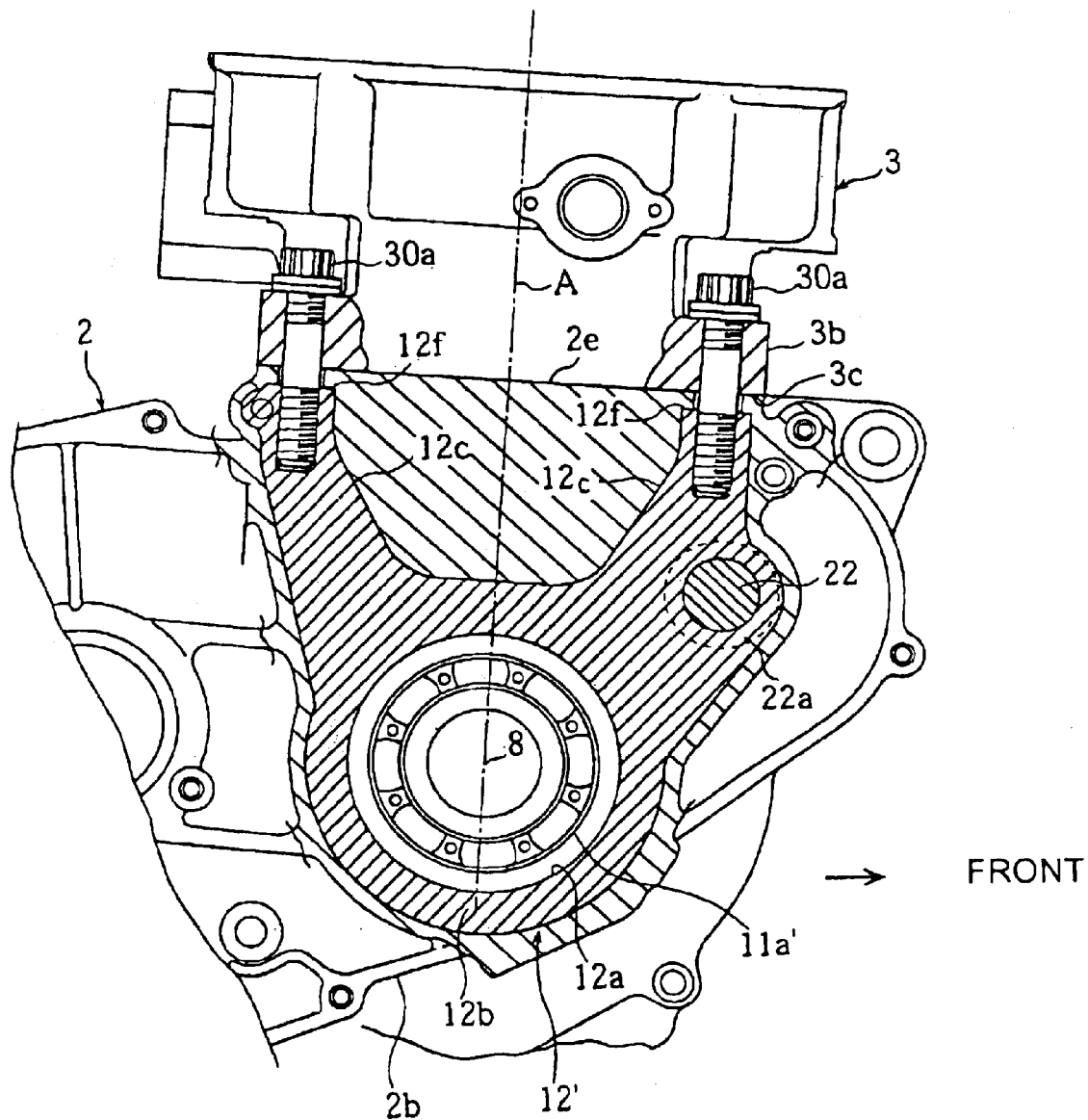
FIG. 16 is a cross sectional, right side view showing a bearing bracket of the engine.

Here, the right bearing bracket 12' comprises a boss portion 12b, into a bearing hole 12a of which a right bearing 11a' for the crankshaft 8 is press-fitted and inserted, as shown in FIGS. 5 and 16. The bolt-coupling portions 12c, 12c extend upward to a neighborhood of the cylinder-side mating surface 2e of the crankcase 2 from front and back portions of the boss portion 12b with the crankshaft 8 therebetween, when viewed in a direction along the crankshaft 8.

Figure 17:
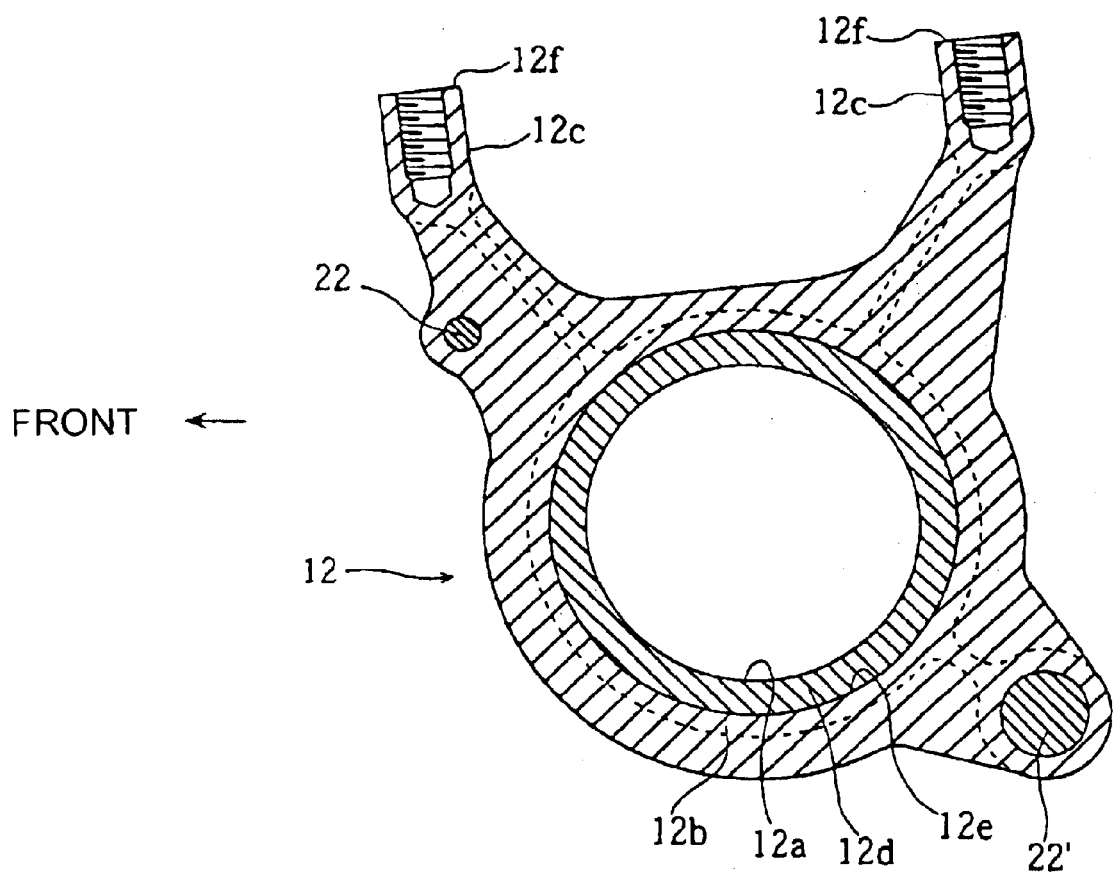
FIG. 17 is a cross sectional, left side view showing a bearing bracket of the engine.
Figure 18:
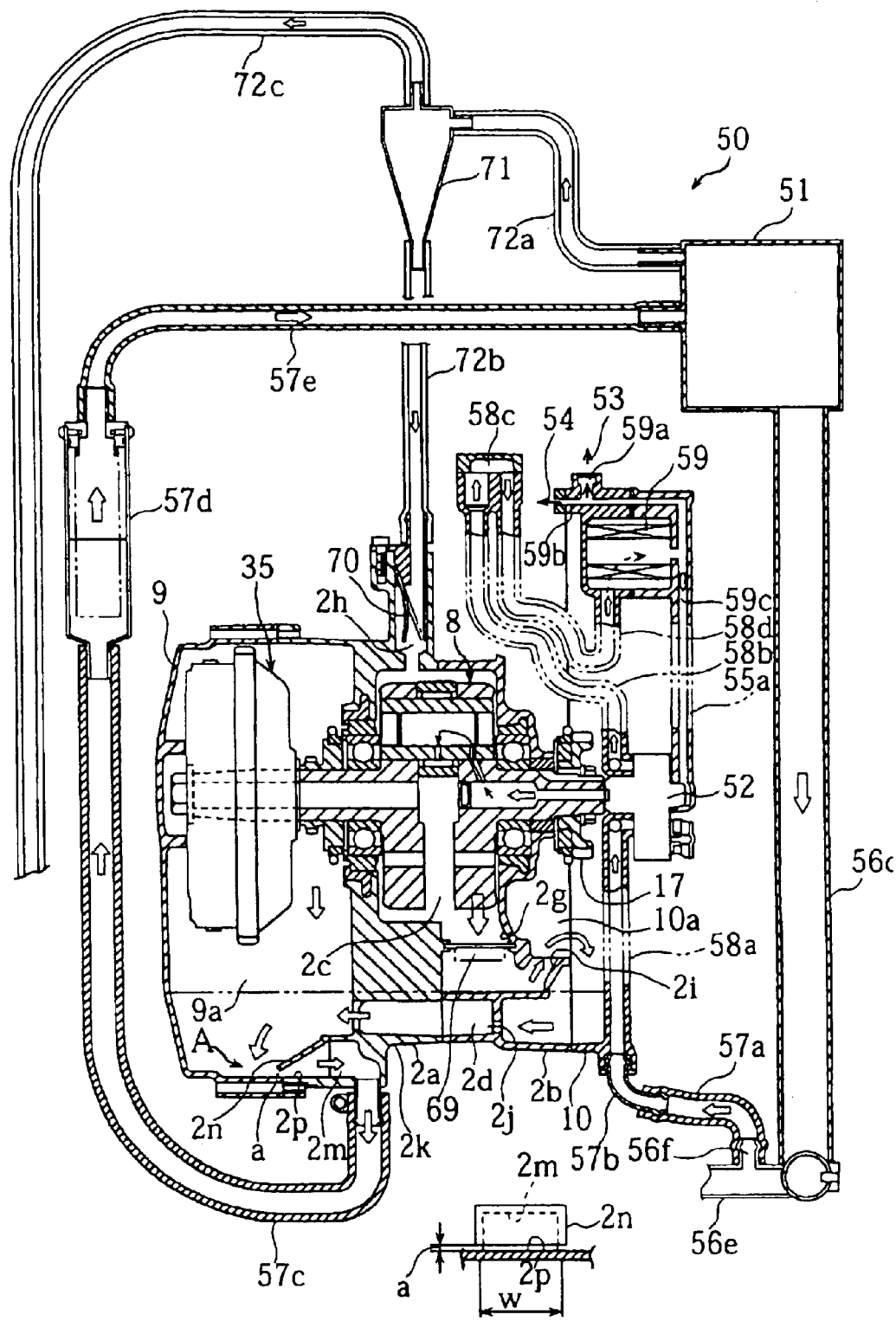
FIG. 18 is a schematic view showing a configuration of a lubricating device of the engine.

Also, the bolt-coupling portions 12c, 12c extend upward to a neighborhood of the cylinder-side mating surface 2e of the crankcase 2 from front and back portions of the left bearing bracket 12 with the crankshaft 8 therebetween, when viewed in the direction along the crankshaft 8, as shown in FIGS. 5 and 17. Also, the boss portion 12b is formed with a collar hole 12e, into which a bearing collar 12d of iron having a larger outside diameter than a balancer drive gear 25a described later is press-fitted. The left crankshaft bearing 11a is fitted and inserted into the bearing hole 12a of the bearing collar 12d.

Here, the bearing collar 12d serves to enable the crankshaft 8 to be assembled into the crankcase 2 in a state, in which a gear body 25 having the balancer drive gear 25a is press-fitted onto the crankshaft 8.

Also, as shown in FIG. 5, a seal plate 25d is interposed between the gear body 25 and the bearing (first journal bearing) 11a on a left shaft portion 8c of the crankshaft 8. An inside diameter portion of the seal plate 25d is interposed between the gear body 25 and an inner race of the bearing 11a, and a slight clearance is present between an outside diameter portion of the seal plate and an outer race of the bearing 11a to avoid interference therebetween. Also, an outer peripheral surface of the seal plate 25d is in sliding contact with an inner peripheral surface of a flange 12h of the bearing collar 12d.

Furthermore, a seal cylinder 17i is interposed between the bearing (second journal bearing) 11a' and a cover plate 17g on a right shaft portion 8c' of the crankshaft 8. An inner peripheral surface of the seal cylinder 17i is fitted onto and fixed to the right shaft portion 8c'. Also, an outer peripheral surface of the seal cylinder 17i is formed with a seal groove of a labyrinth structure, and in sliding contact with an inner surface of a seal hole 2p formed in a right case portion 2b.

In this manner, the seal plate 25d and the seal cylinder 17i are present outside the bearings 11a, 11a' on the left and right shaft portions 8c, 8c' of the crankshaft 8 whereby leakage of pressure from a crank chamber 2c is prevented.

In this manner, according to the embodiment, the bolt-coupling portions (coupling boss portions) 12c, 12c extending toward the cylinder body 3 are integrally formed on both sides of the iron-alloy bearing members 12, 12' for bearing of the crankshaft, cast into the crankcase 2 of aluminum alloy to interpose therebetween a cylinder bore axis A, and the case bolts 30a for coupling the cylinder body 3 to the crankcase 2 are screwed into the bolt-coupling portions 12c, so that the bolt-coupling portions 12c arranged in two front and rear locations with the cylinder bore axis A therebetween can equally bear a load produced by combustion pressure and the rigidity in coupling of the cylinder body 3 and the crankcase 2 can be improved.

Also, since at least one end portion of balancer shafts 22, 22' arranged in the vicinity of and in parallel to the crankshaft 8 is born by the iron-alloy bearing members 12, 12', the balancer shafts 22, 22' can be enhanced in rigidity of bearing.

Furthermore, when the iron bearing brackets 12, 12' are to be embedded in the crankcase 2 of aluminum alloy, upper-end surfaces 12f of the bolt-coupling portions 12c are not exposed to the cylinder-side mating surface 2e of the crankcase 2 but arranged inwardly thereof, so that metallic members, which are different in hardness and material, are not intermixed into the coupling surfaces of the crankcase 2 and the cylinder block 3 and so degradation in sealing quality can be avoided. That is, if the upper-end surfaces 12f of the iron bolt-coupling portions 12c were brought into contact with a case-side mating surface 3c, which is formed on the lower flange 3b of the cylinder body 3 of aluminum alloy, degradation in sealing quality would be caused by a difference in coefficient of thermal expansion, or the like.

Also, since the bearing collar 12 having a larger outside diameter than that of the balancer drive gear 25a is fitted onto an outer periphery of the bearing 11a in the left bearing bracket 12, the balancer drive gear 25a can be mounted without hindrance and without interfering a minimum inside-diameter portion of the boss portion 12b of the bearing bracket 12 when the crankshaft 8 is mounted in the crankcase 2 in a state, in which the balancer drive gear 25a is press-fitted (integral formation will do) onto and fixed to the crankshaft 8.

The crankcase 2 is of a two left and right split type to be composed of left and right case portions 2a, 2b. A left case cover 9 is detachably mounted on the left case portion 2a, and a space surrounded by the left case portion 2a and the left case cover 9 defines a flywheel-magneto chamber 9a. A flywheel-magneto type generator 35 mounted on a left end of the crankshaft 8 is received in the flywheel-magneto chamber 9a. In addition, the flywheel-magneto chamber 9a is communicated to a chamber, in which the cam shaft is arranged, via chain chambers 3d, 4d described later, and a major part of a lubricating oil having lubricated a camshaft drops into the flywheel-magneto chamber 9a via the chain chambers 3d, 4d.

Also, a right case cover 10 is detachably mounted on the right case portion 2b, and a space surrounded by the right case portion 2b and the right case cover 10 defines a clutch chamber 10a.

Formed in front of the crankcase 2 is a crank chamber 2c, and formed behind the crankcase is a transmission chamber 2d. The crank chamber 2c is opened toward the cylinder bore 3a and substantially separated from other chambers such as the transmission chamber 2d or the like. Therefore, pressure in the transmission chamber 2d is varied due to up/down movements of the piston 6 to function as a pump.

The crankshaft 8 is arranged to receive left and right arm portions 8a, 8a and left and right weights 8b, 8b in the crank chamber 2c. The crankshaft 8 is of an assembled type, in which a left crankshaft portion uniting the left arm portion 8a, the left weight 8b, and the left shaft portion 8c is integrally coupled to a right crankshaft portion uniting the right arm portion 8a, the right weight 8b, and the right shaft portion 8c', through a cylindrical-shaped crank pin 8d.

The left and right shaft portions 8c, 8c' are rotatably supported through the crank bearings 11a, 11a' on the left and right case portion 2a, 2b. The bearings 11a, 11a' are press-fitted into the bearing holes 12a of the iron-alloy bearing brackets 12, 12', which are insert-cast into the left and right case portion 2a, 2b of aluminum alloy, as described above.

A transmission mechanism 13 is received and arranged in the transmission chamber 2d. The transmission mechanism 13 comprises a main shaft 14 and a drive shaft 15, which are arranged in parallel to the crankshaft 8, and is of a constantly meshing type construction, in which first to fifth speed gears 1p to 5p mounted on the main shaft 14 constantly mesh with first to fifth speed gears 1w to 5w mounted on the drive shaft 15.

The main shaft 14 is supported through main-shaft bearings 11b, 11b by the left and right case portions 2a, 2b, and the drive shaft 15 is supported through drive-shaft bearings 11c, 11c by the left and right case portions 2a, 2b.

A right end portion of the main shaft 14 extends through the right case portion 2b to project rightward, and the clutch mechanism 16 described above is mounted on the projecting portion, the clutch mechanism 16 being positioned in the clutch chamber 10a. A large reduction gear (input gear) 16a of the clutch mechanism 16 meshes with a small reduction gear 17, which is fixed to and mounted on a right end portion of the crankshaft 8.

A left end portion of the drive shaft 15 projects outward from the left case portion 2a, and a drive sprocket 18 is mounted on the projecting portion. The drive sprocket 18 is coupled to a driven sprocket of a rear wheel via a drive chain.

The balancer device 19 according to the embodiment comprises front and rear (first and second) balancer devices 20, 20', which are arranged in a manner to interpose therebetween the crankshaft 8 and are of substantially the same construction. The front and rear balancer devices 20, 20' comprise front and rear (first and second) balancer shafts 22, 22' of non-rotation type, and front and rear (first and second) balancer weights 24, 24' rotatably supported through bearings 23, 23 on the balancer shafts.

Here, the front and rear balancer shafts 22, 22' also serve as case bolts (coupling bolts) for clamping and coupling the left and right case portion 2a, 2b together in a direction along the crankshaft. The front and rear balancer shafts 22, 22' comprise a case interior portion 22g positioned to extend through the crank chamber 2c, and a bearing portion extending outside of the crank chamber 2c to bear the balancer weight 24, 24' through the bearing 23. While the bearing portion is set to have a relatively large diameter, which involves no hindrance in bearing the balancer weight 24, 24' through the bearing 23, the case interior portion 22g is set to have a small diameter in a manner to withstand a required coupling force, that is, substantially the same as that of ordinary case coupling bolts. In addition, a boundary portion between the case interior portion 22g of a small diameter and the bearing portion of a large diameter is formed to be tapered.

Flanges 22a, 22a' formed inwardly of the supported balancer weights 24, 24' in a widthwise direction of the engine abut against boss portions 12g of the bearing brackets 12, 12' inserted into the left and right case portion 2a, 2b and fixing nuts 21b, 21a are screwed onto opposite end portions of the balancer shafts whereby the balancer shafts 22, 221 couple the left and right case portion 2a, 2b together.

The balancer weights 24, 24' of the front and rear balancer devices 20, 20' comprise a substantially semi-circular weight body 24a, 24a' and a circular-shaped gear support 24b, 24b' formed integral therewith, and a ring-shaped balancer driven gear 24c, 24c' is mounted on and fixed to the gear support 24b, 24b'. In addition, the reference numeral 24d denotes a lightening hole, by which a weight of a portion diametrically opposed to the weight body 24a, 24a' is reduced as much as possible.

Here, the front and rear balancer devices 20, 20' are arranged to approach the crankshaft 8 to such an extent that when viewed in a direction along the crankshaft, loci of rotation of the balancer weights 24, 24' partially overlap a locus of rotation of a conrod coupling portion formed by coupling a large end 7a of the conrod 7 to the arm portion 8a of the crankshaft 8 by a crank pin 65, and a locus of rotation of the right weight 8b.

The balancer driven gear 24c' of the rear balancer device 20' meshes with the balancer drive gear 25a on the crankshaft 8. The balancer drive gear 25a is mounted on the gear body 25, which is press-fitted onto and fixed to the left shaft portion 8c of the crankshaft 8 to be rotatable relative thereto. In addition, the gear body 25 is adjacent to the left journal bearing 11a.

Figure 11:
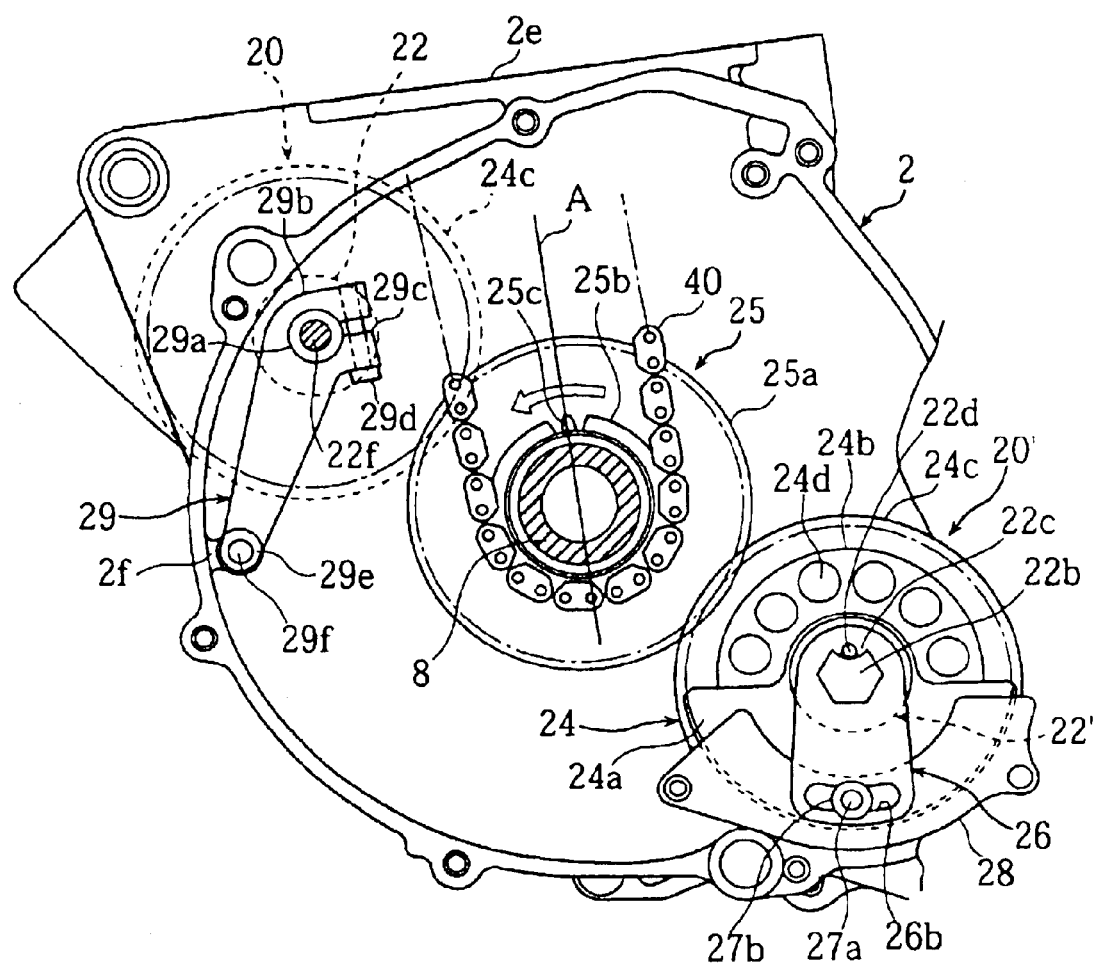
FIG. 11 is a left side view showing a balancer device of the engine.

In addition, the reference numeral 25b denotes a sprocket integrally formed on the gear body 25 to drive a timing chain, the sprocket 25b having on an outer side thereof a registration mark 25c for setting of a valve timing as shown in FIG. 11. The gear body 25 is fitted onto the crankshaft 8 such that when the crankshaft 8 is in a top dead center position of compression, the registration mark 25c coincides with the cylinder bore axis A as viewed in the direction along the crankshaft.

Also, the balancer driven gear 24c mounted on the gear support 24b of the balancer weight 24 of the front balancer device 20 meshes with a balancer drive gear 17a on the crankshaft 8. The balancer drive gear 17a is supported on the small reduction gear 17, which is fixed to and mounted on the right shaft portion 8c' of the crankshaft 8, to be rotatable relative thereto.

Here, the balancer drive gear 25a for the rear balancer device 20' is supported on the gear body 25 to be rotatable relative thereto, and the balancer drive gear 17a for the front balancer device 20 is supported on the small reduction gear 17 to be rotatable relative thereto. And buffer springs 33 formed from U-shaped plate springs are interposed between the balancer drive gears 25a, 17a and the gear body 25 and the small reduction gear 17, whereby shocks caused by torque nonuniformity of the engine or the like are suppressed in transmission to the front and rear balancer devices 20, 20'.

Figure 14:
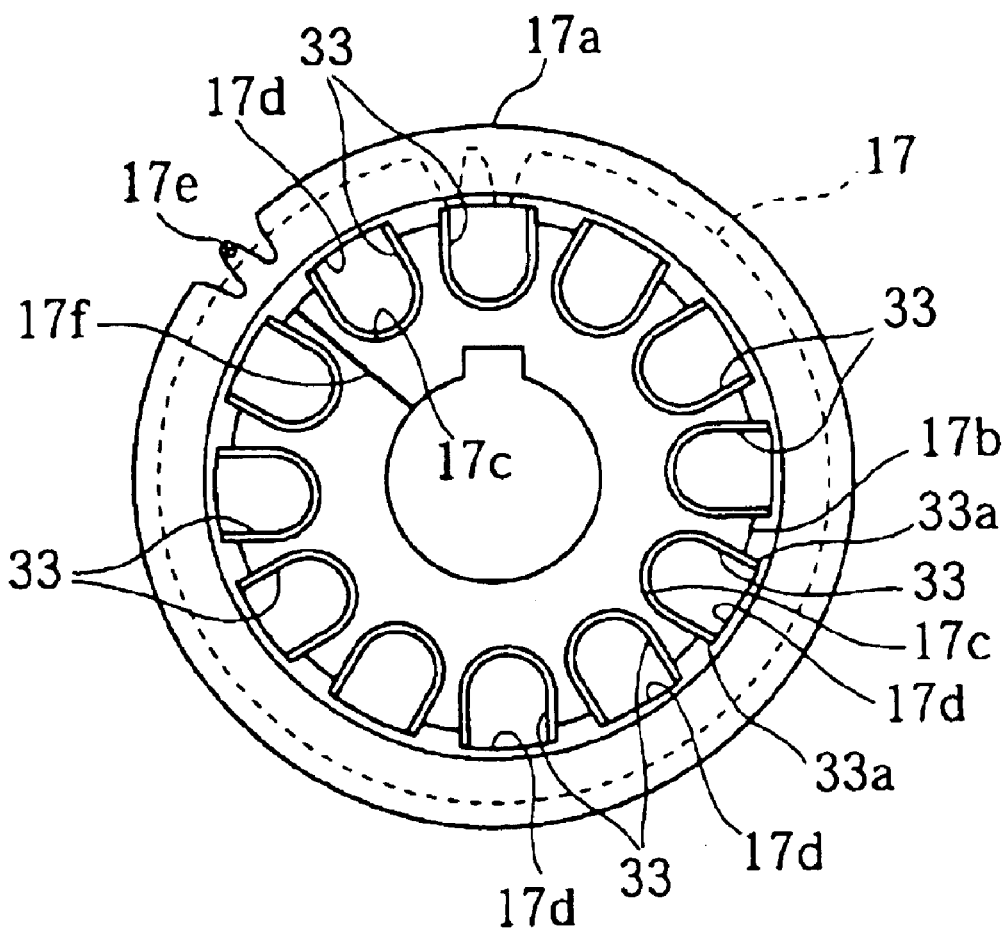
FIG. 14 is a side view showing a buffer structure of a balancer drive gear of the balancer device.
Figure 15:
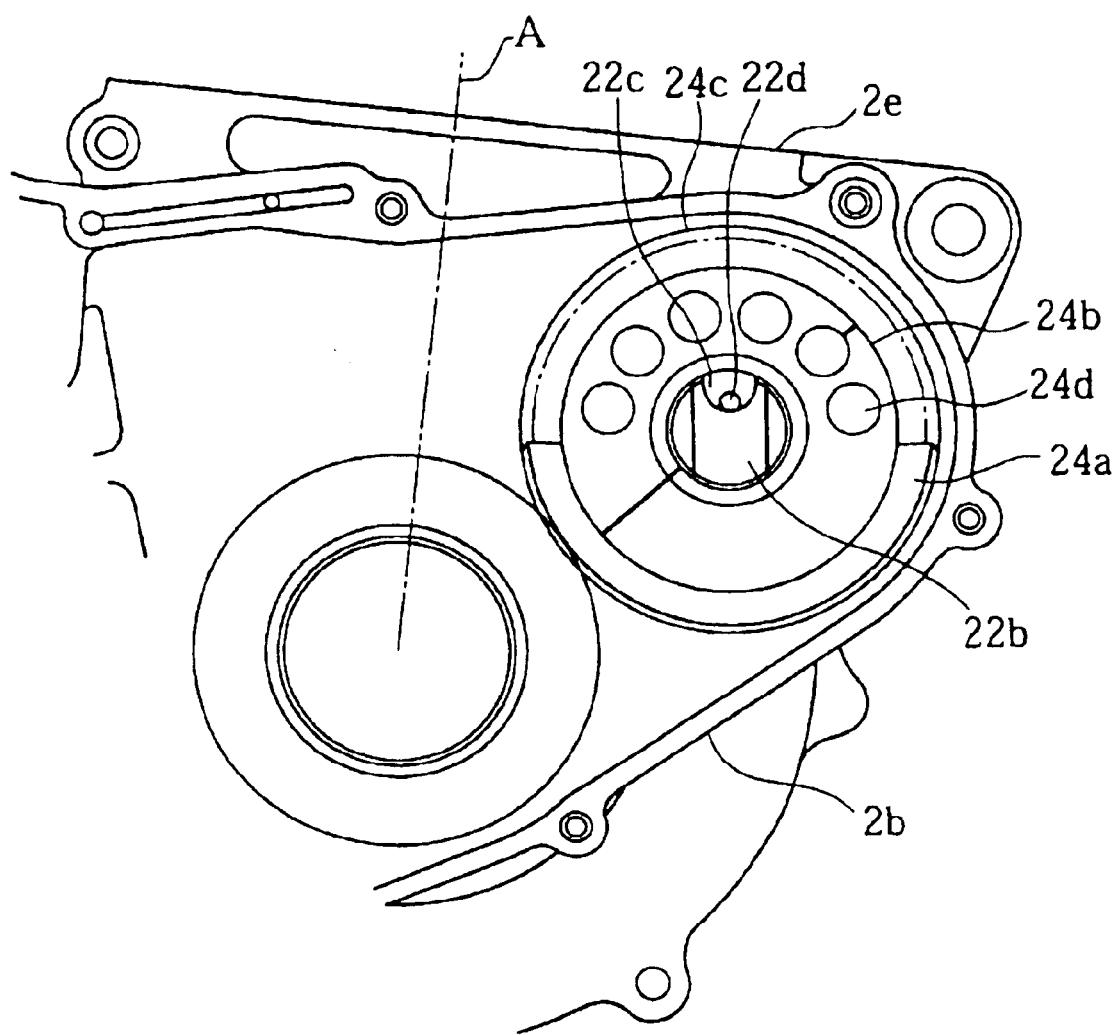
FIG. 15 is a right side view showing the balancer device.

Here, the balancer drive gear 17a for the front-side driving will be described in further detail with reference to FIG. 14, and the same is with the balancer drive gear 25a for the rear-side driving. The balancer drive gear 17a is ring-shaped and supported on a slide surface 17b, which is formed on a side of the small reduction gear 17 to have a smaller diameter than that of the same, to be rotatable relative thereto. A multiplicity of U-shaped spring holding grooves 17c are recessed in the slide surface 17b to extend radially about a core of the crankshaft, the U-shaped buffer springs 33 being inserted and arranged in the spring holding grooves 17c. Open ends 33a, 33a of the buffer springs 33 are latched on front and rear steps of latch recesses 17d formed on an inner peripheral surface of the balancer drive gear 17a.

When relative rotations due to torque nonuniformity or the like generate between the small reduction gear 17 and the balancer drive gear 17a, the buffer springs 33 are elastically deformed in a direction, in which spacings between the ends 33a, 33a decrease, to absorb torque nonuniformity. In addition, the reference numeral 17g denotes a cover plate for holding the buffer springs 33 in the holding grooves 17c, 17h a key for coupling the small reduction gear 17 to the crankshaft 8, and 17e, 17f registration marks used at the time of assembly of the small reduction gear 17 and the balancer drive gear 17a.

Mechanisms are provided on the front and rear balancer devices 20, 20' to regulate backlash between the balancer driven gears 24c, 24c' and the balancer drive gears 17a, 25a. The regulating mechanisms are constructed to make balancer axes of the balancer shafts 22, 22' and axes of rotation of the balancer driven gears 24c, 24c' slightly eccentric relative to each other. More specifically, when the balancer shafts 22, 22' are turned about the balancer axes, the eccentricity causes slight changes in spacings between axes of rotation of the balancer driven gears 24c, 24c' and axes of rotation of the balancer drive gears 17a, 25a, so that changes in backlash result.

Here, the mechanisms for turning the front and rear balancer shafts 22, 22' about the balancer axes are different between the front balancer device 20 and the rear balancer device 20'. First, with the rear balancer device 20', a hexagonal-shaped latch projection 22b is formed on a left end of the rear balancer shaft 22', and a spline-shaped (polygonal star-shaped) latch hole 26a formed on one end of a turning lever 26 is latched on the latch projection 22b. Also, a bolt hole 26b being arcuate about the balancer axis is formed on the other end of the turning lever 26.

A fixing bolt 27 inserted into the bolt hole 26b is implanted into a guide plate 28. The guide plate 28 is generally arcuate to be bolted and fixed to the crankcase 2. In addition, the guide plate 28 also has a function of regulating a flow of a lubricating oil.

Backlash of the rear balancer device 20' is regulated by turning the turning lever 26 in a state, in which the fixing nut 21a is loosened, to put backlash in an appropriate condition, and then using the fixing bolt 27a and the nut 27b to fix the turning lever 26, and thereafter the fixing nut 21a is clamped.

Figure 12:
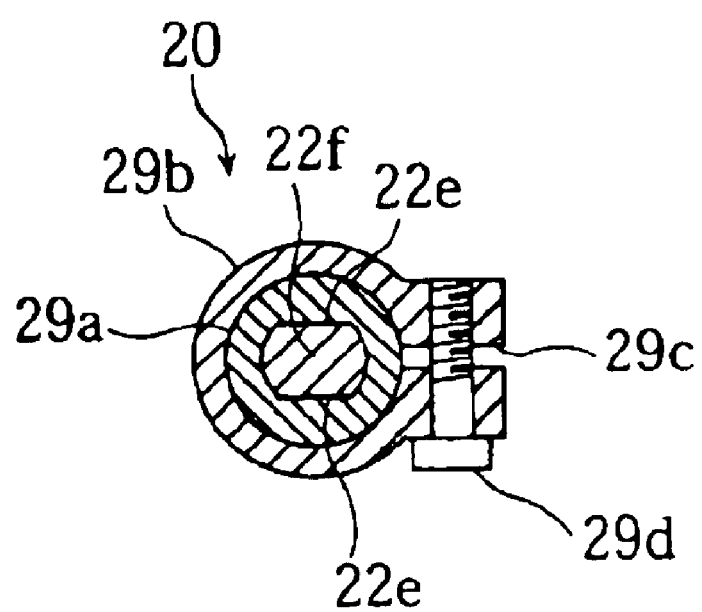
FIG. 12 is an enlarged, cross sectional view showing a mount for a holding lever of the balancer device.
Figure 13:
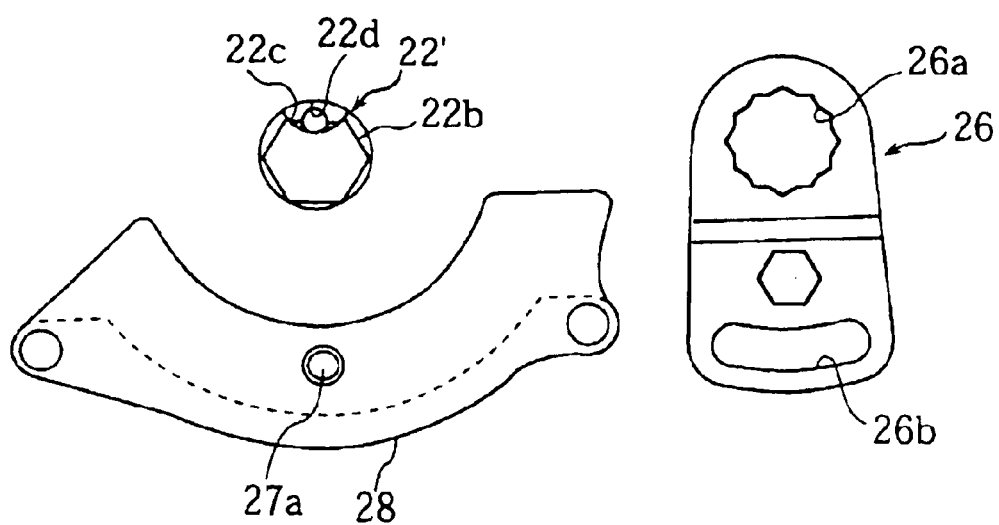
FIG. 13 is a side view showing constituent parts of a turning lever of the balancer device.

Formed on a left end of the front balancer shaft 22 is a grip portion 22f having an oval-shaped cross-section and formed on both sides of a circular cross section with flat portions 22e (see FIG. 12). A collar 29a having an inner peripheral shape corresponding to an outer peripheral shape of the grip portion 22f is mounted on the grip portion 22f, and a holding portion 29b of a holding lever 29 is mounted outside the collar 29a to be axially movable but non-rotatable relative thereto. A tip end 29e of the holding lever 29 is fixed to a boss portion 2f of the left case portion 2a by means of a bolt 29f. Also, a clamping slit 29c is formed in the holding portion 29b of the holding lever 29 to prevent rotation of the collar 29a and hence the balancer shaft 22 upon clamping of a fixing bolt 29d. Moreover, the fixing nut 21b is screwed axially outwardly of the collar 29a onto the balancer shaft 22 with a washer therebetween.

Backlash of the front balancer device 20 is regulated by loosening, preferably, removing the fixing nut 21b, using a tool to grip the grip portion 22f of the balancer shaft 22 to turn the same in a manner to put backlash in an appropriate condition, and then clamping the fixing bolt 29d, and thereafter the fixing nut 21b is clamped.

Also, an upper portion of the latch projection 22b on the balancer shaft 22, 22' is arcuately cut out to form a lubricating oil introducing portion 22c. A guide hole 22d is opened to the introducing portion 22c, the guide hole 22d being extended through the balancer shaft 22 to reach a lower portion of an outer peripheral surface of the balancer shaft, whereby the lubricating oil introducing portion 22c is communicated to an inner peripheral surface of the balancer bearing 23. In this manner, a lubricating oil dropping into the lubricating oil introducing portion 22c is fed to the balancer bearing 23.

Here, the balancer weight 24 and the balancer driven gear 24c are arranged in a right end in the direction along the crankshaft with the front balancer device 20 while they are arranged in a left end with the rear balancer device 20'. Also, the balancer driven gear 24c, 24c' is positioned rightwardly of the balancer weight 24, 24' with both the front and rear balancer devices 20, 20', so that the front and rear balancer weights 24, 24' and the balancer driven gears 24c, 24c' are set to assume the same shapes with both the front and rear balancer devices.

In this manner, according to the embodiment, since the weight body 24a and the balancer driven gear 24c of the balancer weight 24 are arranged in the right end (one end) of the front (first) balancer shaft 22 in the direction along the crankshaft and the weight body 24a' and the balancer driven gear 24c' of the balancer weight 24' are arranged in the left end (the other end) of the rear (second) balancer shaft 22' in the direction along the crankshaft, heavy loads are arranged left and right across the direction along the crankshaft whereby it is possible to avoid that worsening in weight balance in the direction along the crankshaft, which is caused in the case where a two-axis type balancer device is provided.

Also, since the front and rear balancer shafts 22, 22' are arranged to approach the crankshaft 8 to such an extent that loci of rotation of the balancer weights 24, 24' partially overlap a locus of rotation of that portion of the crankshaft 8, which is coupled to the conrod, it is possible to avoid that large-sizing around the crankcase, which is caused by arrangement of two balancer shafts away from a crankshaft, in the case where a two-axis type balancer device is provided.

Also, since the front and rear balancer shafts 22, 22' also serve as case bolts for coupling the left and right case portions 2a, 2b together, it is possible to enhance a crankcase in coupling rigidity while suppressing complication of a construction and an increase in the number of parts, in the case where a two-axis type balancer device is adopted, and to reduce a space, in which exclusive case coupling bolts are arranged, and in this point it is possible to avoid large-sizing around the crankcase.

Moreover, since the crankcase-interior portion 22g of the balancer shaft 22, 22' is formed to have a smaller diameter than the born portion, there is caused no hindrance in bearing the balancer weight 24, 24', and therefore it is possible to make the balancer shaft 22, 22' close to the crankshaft 8 to the limit, and in this point it is also possible to avoid large-sizing around the crankcase.

Also, since the weight bodies 24a, 24a', respectively, are united with the balancer gears 24c, 24c', respectively, and rotatably supported on the balancer shafts 22, 22', it suffices to rotatingly drive only the balancer weights 24, 24' composed of the weight body 24a and the balancer driven gear 24c, and it is unnecessary to rotatingly drive the balancer shafts themselves, according to which it is possible to achieve making effective use of an engine output.

Moreover, since the front and rear balancer weights 24, 24' are arranged to be close to outsides of the journal bearings 11a, 11a', which support both sides of the arm portion 8a constituting that portion of the crankshaft 8, which is coupled to the conrod, a dimension in the direction along the crankshaft can be minimized, so that in the case where a two-axis type balancer device is provided, it is possible to avoid a problem that enlargement around the crankcase in the direction along the crankshaft is caused due to arrangement of balancer weights away from that portion of a crankshaft, which is coupled to a conrod, in a direction along the crankshaft.

Also, since the balancer weights 24, 24' are separate from the balancer shafts 22, 22', freedom in assembly can be improved as compared with a constitution, in which these elements are united together.

Also, since axes of rotation of the balancer driven gears 24c, 24c' are made eccentric from axes of the balancer shafts 22, 22', a simple construction and a simple operation of rotating the balancer shafts make it possible to regulate backlash relating to the balancer driven gears 24c, 24c' and the balancer drive gears 17a, 25a on the crankshaft 8, thus enabling preventing generation of noise.

With the front balancer shaft 22, backlash is regulated by using a tool to grip the grip portion 22f formed leftward in a lateral direction of the balancer shaft 22 to turn the balancer shaft 22, and with the rear balancer shaft 22', backlash is regulated by turning the turning lever 26 provided similarly leftward in the lateral direction. In this manner, with either of the front and rear balancer shafts 22, 22', backlash can be regulated from leftwardly of the engine, so that it is possible to efficiently perform a work of backlash regulation.

Also, since the balancer drive gear 17a on the crankshaft 8 to mesh with the balancer driven gear 24c is arranged to be rotatable relative to the slide surface 17b of the small reduction gear 17 fixed to the crankshaft 8 and the U-shaped buffer springs 33 are arranged in the spring holding grooves 17c recessed in the slide surface 17d, such compact construction absorbs shocks caused by torque nonuniformity of the engine or the like to be able to smoothly actuate the balancer device. In addition, the same is with the balancer drive gear 25a.

Moreover, a cooling water pump 48 is arranged on a right end of the front balancer shaft 22 to be coaxial therewith. An Oldham's coupling or the like, having the same structure as that with a lubricating oil pump 52 described later connects a rotating shaft of the cooling water pump 38 to the balancer shaft 22 to accommodate some off-centering between the both.

A valve gear in the embodiment causes the crankshaft 8 to drivingly rotate an intake cam shaft 36 and an exhaust cam shaft 37 arranged in the head cover 5. Concretely, the crank sprocket 25b on the gear body 25 press-fitted onto the left shaft portion 8c of the crankshaft 8 and an intermediate sprocket 38a born by a support shaft 39 implanted in the cylinder head 4 are coupled to each other by a timing chain 40, and an intermediate gear 38b formed integral with the intermediate sprocket 38a and having a smaller diameter than that of the intermediate sprocket 38a meshes with intake and exhaust gears 41, 42, which are fixed to ends of the intake and exhaust cam shafts 36, 37. In addition, the timing chain 40 is disposed to pass through chain chambers 3d, 4d formed on left walls of the cylinder block 3 and the cylinder head 4.

The intermediate sprocket 38a and the intermediate gear 38b are born through two sets of needle bearings 44 by the support shaft 39, which is disposed on the cylinder bore axis A to extend through the chain chamber 4d of the cylinder head 4 in the direction along the crankshaft. A flange 39a of the support shaft 39 is fixed to the cylinder head 4 by means of two bolts 39b. In addition, the reference numerals 39c, 39d denote gaskets for sealing.

Here, commercially available products (standardized goods) are employed for the two sets of needle bearings 44, 44, a collar 44a for regulation of spacing is arranged between the respective bearings 41, 41, and thrust washers 44b, 44b are arranged on both ends to bear thrust loads. The thrust washers 44b are stepped to comprise a large-diameter portion, which slidingly contacts with an end surface of the intermediate sprocket, and a stepped portion projecting axially toward the needle bearing 44.

In this manner, since the collar 44a for regulation of spacing is interposed between the two sets of needle bearings 44, 44, regulation of a length of the collar 44a makes it possible to employ commercially available standardized goods for the needle bearings, thus enabling reduction in cost.

Also, since stepped ones are employed for the thrust washers 44b, it is possible to improve workability in assembling the intermediate sprocket 38a. More specifically, when the intermediate sprocket 38a is to be assembled, the support shaft 39 is inserted from outside in a state, in which the intermediate sprocket 38a and the intermediate gear 38b with the thrust washers disposed on both ends thereof in a manner to prevent falling of the thrust washers are arranged in the chain chamber 4d. By latching stepped portions of the thrust washers 44b on a shaft hole of the intermediate sprocket 38a, falling of the thrust washers 44b can be prevented, and so the assembling quality can be improved correspondingly.

Also, formed in the support shaft 39 are oil holes 39e, through which a lubricating oil introduced from the cam chamber via an oil introduction hole 4e formed in the cylinder head 4 is fed to the needle bearings 44.

Also, four lightening holes 38c and two lightening/peeping holes 38c' for assembly are formed on the intermediate sprocket 38a to be spaced 60 degrees from one another. And registration marks 38d are marked on teeth disposed substantially centrally of the peeping holes 38c' of the intermediate gear 38b, and registration marks 41a, 42a are marked on two teeth of the intake and exhaust cam gears 41, 42 to correspond to the registration marks 38d. Here, when the left and right registration marks 38d, 38d are made coincident with the registration marks 41a, 42a, the intake and exhaust cam shafts 41, 42 are positioned in the top dead center position of compression.

Moreover, registration marks 38e, 38e are formed on those portions of the intermediate sprocket 38a, which are positioned on a cover-mating surface 4f of the cylinder head 4 when the registration marks 38d are coincident with the registration marks 41a, 42a.

In order to set a valve timing, the registration mark 25c (see FIG. 11) is first made to coincide with the cylinder bore axis A, whereby the crankshaft 8 is kept in the top dead center position of compression. Also, the intermediate sprocket 38a and the intermediate gear 38b, which are mounted on the cylinder head 4 with the support shaft 39 therebetween, are positioned so that the registration marks 38e, 38e on the intermediate sprocket 38a are made coincident with the cover-mating surface 4f, and in this state, the cam sprocket 25b and the intermediate sprocket 38a are coupled to each other by the timing chain 40. And the intake and exhaust cam gears 41, 42 on the intake and exhaust cam shafts 36, 37 are caused to mesh with the intermediate gear 38b while it is confirmed through the peeping holes 38c' whether the registration marks 41a, 42a are coincident with the registration marks 38d of the intermediate gear 38b, and the intake and exhaust cam shafts 36, 37 are fixed to an upper surface of the cylinder head 4 through a cam carrier.

In this manner, since the lightening/peeping holes 38c' are provided on the intermediate sprocket 38a having a large diameter to enable confirming therethrough a state, in which the registration marks 38d of the intermediate gear 38b disposed on a back surface side and having a small diameter are coincident with the registration marks 41a, 42a of the cam gears 41, 42, a position, in which the intermediate gear 38b meshes with the cam gears 41, 42, can be visually confirmed with ease and certainty and the valve timing can be set without hindrance although the intermediate gear 38b having a small diameter is arranged on a back surface of the intermediate sprocket 38a having a large diameter.

Also, since the intermediate gear 38b can be arranged on a back surface side of the intermediate sprocket 38a, it is possible to shorten dimensions from the cam gears 41, 42, which mesh with the intermediate gear 38b, to cam noses 36a, and to correspondingly decrease twist angles of the cam shafts, thus enabling enhancing an accuracy, with which valve opening and closing timings are controlled. Also, parts around the cam shafts can be made compact.

More specifically, for example, in the case where the intermediate gear 38b is arranged on a front surface of the intermediate sprocket 38a, a valve timing can be readily set but the dimensions from the cam gears 41, 42 to the cam noses are lengthened, and the twist angles of the cam shafts are correspondingly increased, so that the accuracy, with which valve opening and closing timings are controlled, is degraded.

Also, in the case where the intermediate gear 38b is arranged on the front surface of the intermediate sprocket 38a, it is necessary to enlarge spacings between the intermediate sprocket support shaft 39 and the cam shafts 36, 37 in order to avoid interference between the intermediate sprocket 38a and the cam shafts 36, 37, and there is correspondingly caused a fear of parts around the cam shafts being made large-sized.

Here, a backlash regulation mechanism is provided between the intermediate gear 38b and the cam gears 41, 42.

The regulation mechanism is constructed such that an intake cam gear 41 and an exhaust cam gear 42, respectively, comprise two gears, that is, a drive gear (power electrically-driven gear) 46, and a shift gear (regulation gear) 45, and the drive gear 46 and the shift gear 45 are adjustable in angular position.

More specifically, the shift gear 45 and the drive gear 46 are fixed to flanges 36b, 37b formed on ends of the cam shafts 36, 37 to be made adjustable in angular position by means of four circumferentially-lengthy slots 45a, 46a and four lengthy bolts 68a, and relief portions 46b are cut out to be formed on the outwardly-positioned drive gears 46, so that with the use of the relief portions 46b only the shift gears 45 are fixed in a manner to be made adjustable in angular position by means of two lengthy slots 45b and two short bolts 68b.

Figure 3:
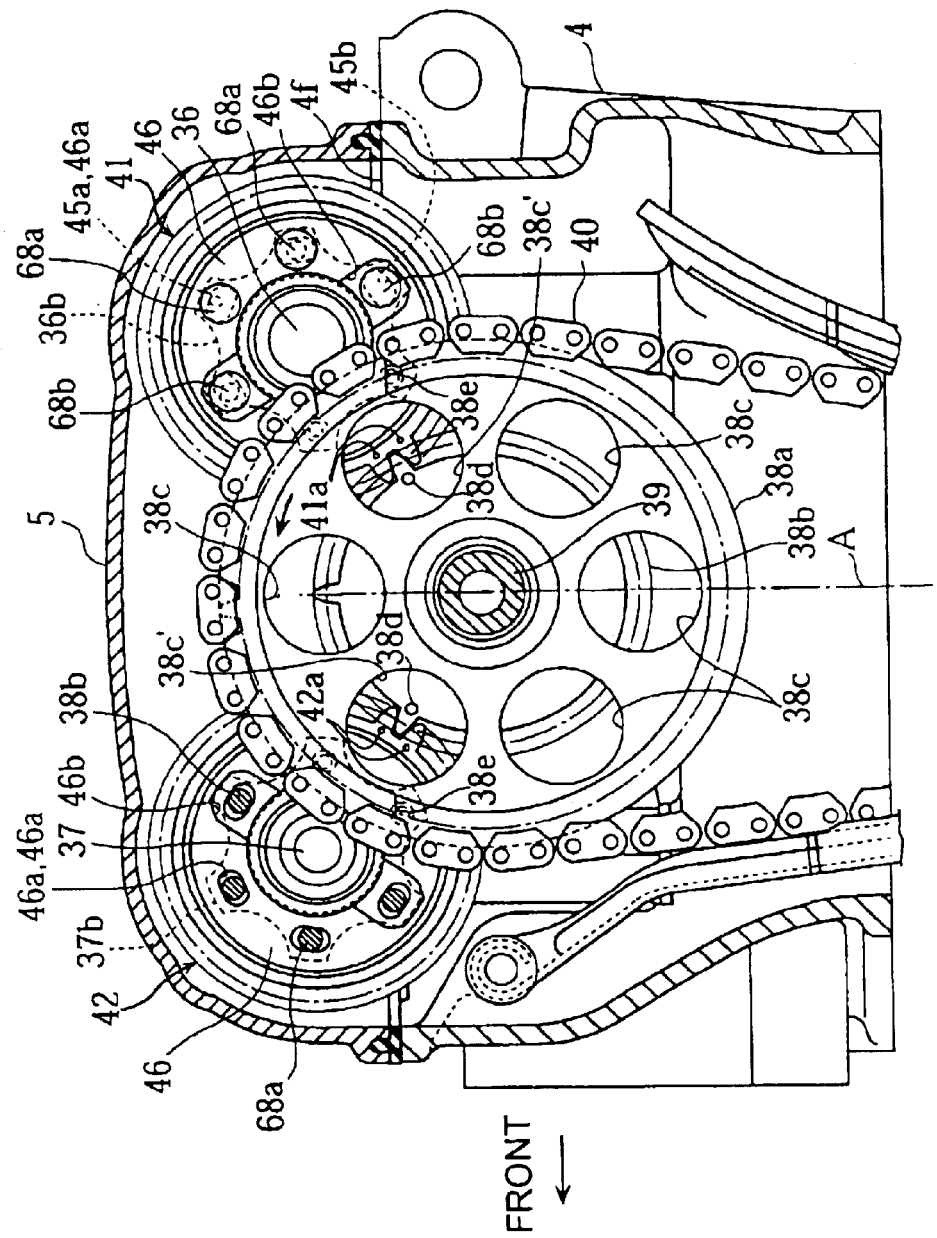
FIG. 3 is a left side view showing a valve gear of the engine.
Figure 4:
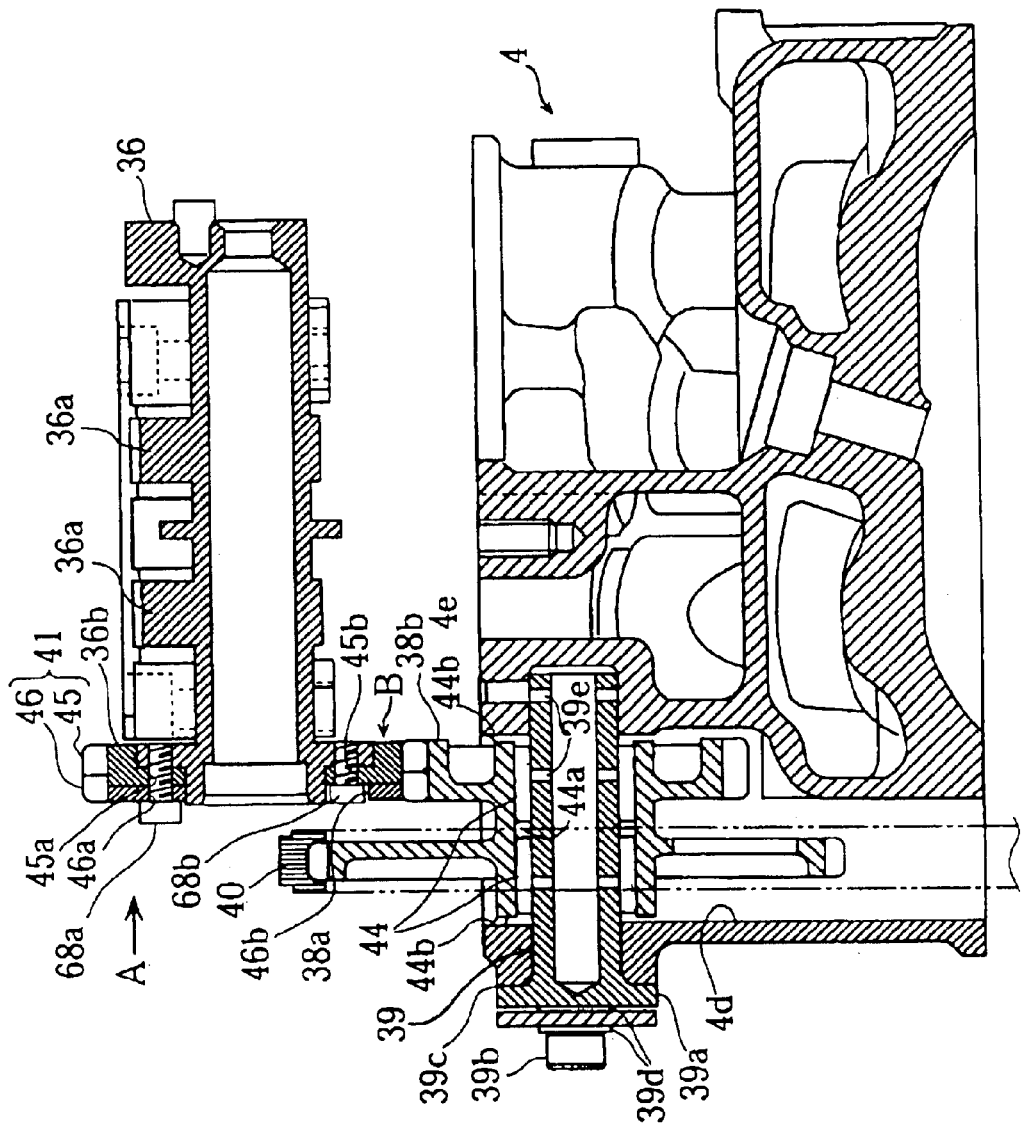
FIG. 4 is a back surface view showing a cross section of the valve gear.

Backlash is regulated in the following procedure. In addition, with the engine according to the embodiment, the intermediate gear 38b rotates in a counterclockwise direction as viewed from leftwardly of the engine as shown in FIG. 3. Accordingly, both the intake and exhaust cam gears 41, 42 rotate in a clockwise direction. While backlash regulation is described herein with respect to the intake cam gear 41, the same is with the exhaust cam gear 42.

First, all of fixing bolts 68a, 68b on the intake cam gear 41 are loosened, the shift gear 45 is turned clockwise, a clockwise leading tooth-surface of the shift gear 45 is caused to lightly abut against a counterclockwise trailing tooth-surface of the intermediate gear 38b, and in this state two short bolts 68b are used to fix the shift gear 45 to the flange 36b of the cam shaft 36. Then the drive gear 46 is turned counterclockwise, a counterclockwise leading tooth-surface (driven surface) thereof is caused to abut against a counterclockwise leading tooth-surface (drive surface) of the intermediate gear 38b so that a predetermined backlash is obtained, and in this state four lengthy bolts 68a are driven to thereby fix the drive gear 46 and the shift gear 45 to the intake cam shaft 36.

In this manner, since the intake cam gear 41 and the exhaust cam gear 42, respectively, comprise the drive gear (power transmitting gear) 46 and the shift gear (regulation gear) 45 rotatable relative to the drive gear, backlash can be regulated by turning the shift gear 45 relative to the drive gear 46 forward or rearward in a direction of rotation.

In addition, while the embodiment has been described with respect to the case where both the drive gear 46 and the shift gear 45, which constitute the cam gears 41, 42, are rotatable relative to the cam shafts, one of the drive gear 46 and the shift gear 45 may be made relatively rotatable and the other gear may be made integral with the cam shaft. In this case, it is desired that the gears made integral with the cam shafts be made power transmitting gears. Even with such constitution, the same action and effect as those in the embodiment are obtained.

Also, while the embodiment has been described with respect to the case where the invention is applied to a chain-driving system, the invention can be of course applied to a drive-system with a toothed belt.

Subsequently, a lubrication construction will be described.

With a lubricating device 50 in the engine according to the embodiment, a lubricating oil stored in a separate lubricating oil tank 51 is drawn and pressurized by a lubricating oil pump 52 through down tubes 56c of a car body frame 56, an oil discharged from the pump 52 is divided into three systems of a cam lubricating system 53, a transmission lubricating system 54, and a crank lubricating system 55 to be fed to respective sections being lubricated, and the lubricating oil having lubricated these sections being lubricated is returned to the lubricating oil tank 51 making use of pressure fluctuation in the crank chamber 2c, caused by up and down movements of the piston 6.

The lubricating oil tank 51 is formed integrally in a space surrounded by a head pipe 56a of the car body frame 56, a main tube 56b, the down tubes 56c, and a reinforcement bracket 56d. The lubricating oil tank 51 is communicated to a cross pipe 56e, which connects lower portions of the down tubes 56c together, from the down tubes 56c.

The cross pipe 56e is connected to a suction port of the lubricating oil pump 52 through an outlet tube 56f, which is connected to the cross pipe, an oil hose 57a, a joint pipe 57b, and an oil suction passage 58a formed on the crankcase cover. A discharge port of the lubricating oil pump 52 is connected to an oil filter 59 via an oil discharge passage 58b, an outside connection chamber 58c, and an oil passage 58d, and divided on a downstream side of the oil filter 59 into the three lubrication systems 53, 54, 55.

The oil filter 59 comprises an oil element 59e arranged in a filter chamber 59d, which comprises a filter cover 47 detachably mounted on a filter recess 10b recessed in the right case cover 10.

The cam lubricating system 53 has an outline construction such that a lower end of a longitudinal portion 53a of a T-shaped lubricating oil pipe is connected to a cam-side outlet 59a of an oil passage formed outside the filter recess 10b from the filter cover 47 and left and right ends of a transverse portion 53b of the lubricating oil pipe are connected to cam-shaft oil-feed passages 53c to permit a lubricating oil to be fed to sections being lubricated, such as bearing portions of the cam shafts 36, 37, via the passages 53c.

The transmission lubricating system 54 is constructed in the following manner. A right transmission oil-feed passage 54a formed in the right case portion 2b is connected to a transmission-side outlet 59b of the oil filter 59, and the oil-feed passage 54a is communicated to a main-shaft hole 14a formed in an axial core of the main shaft 14 via a left transmission oil-feed passage 54b formed in the left case portion 2a. And the main-shaft hole 14a is communicated to sliding portions of the main shaft 14 and change gears via a plurality of branch holes 14b, so that a lubricating oil fed to the main-shaft hole 14a is fed to the sliding portions through the branch holes 14b.

Figure 19:
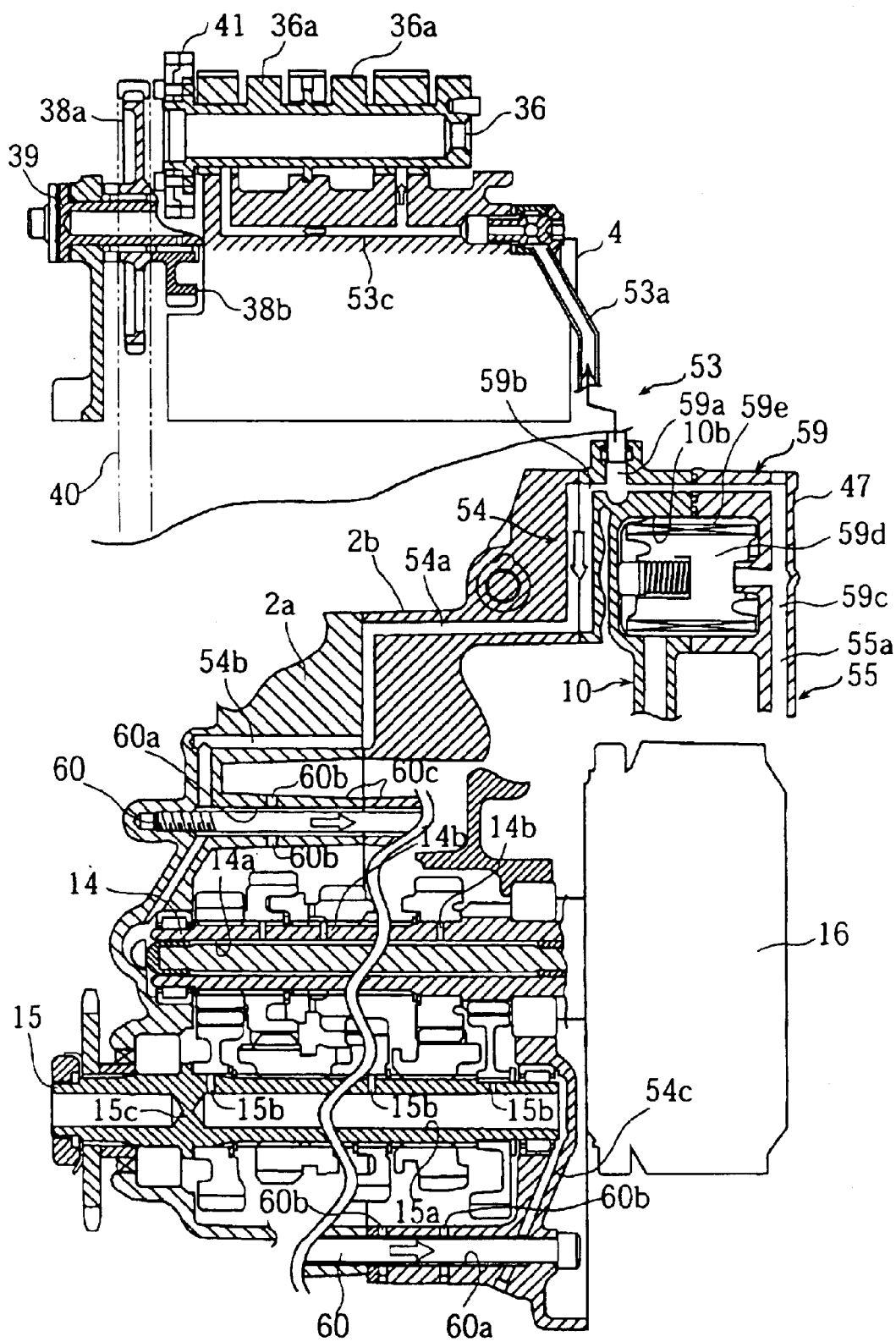
FIG. 19 is a view showing a configuration of the lubricating device.
Figure 20:
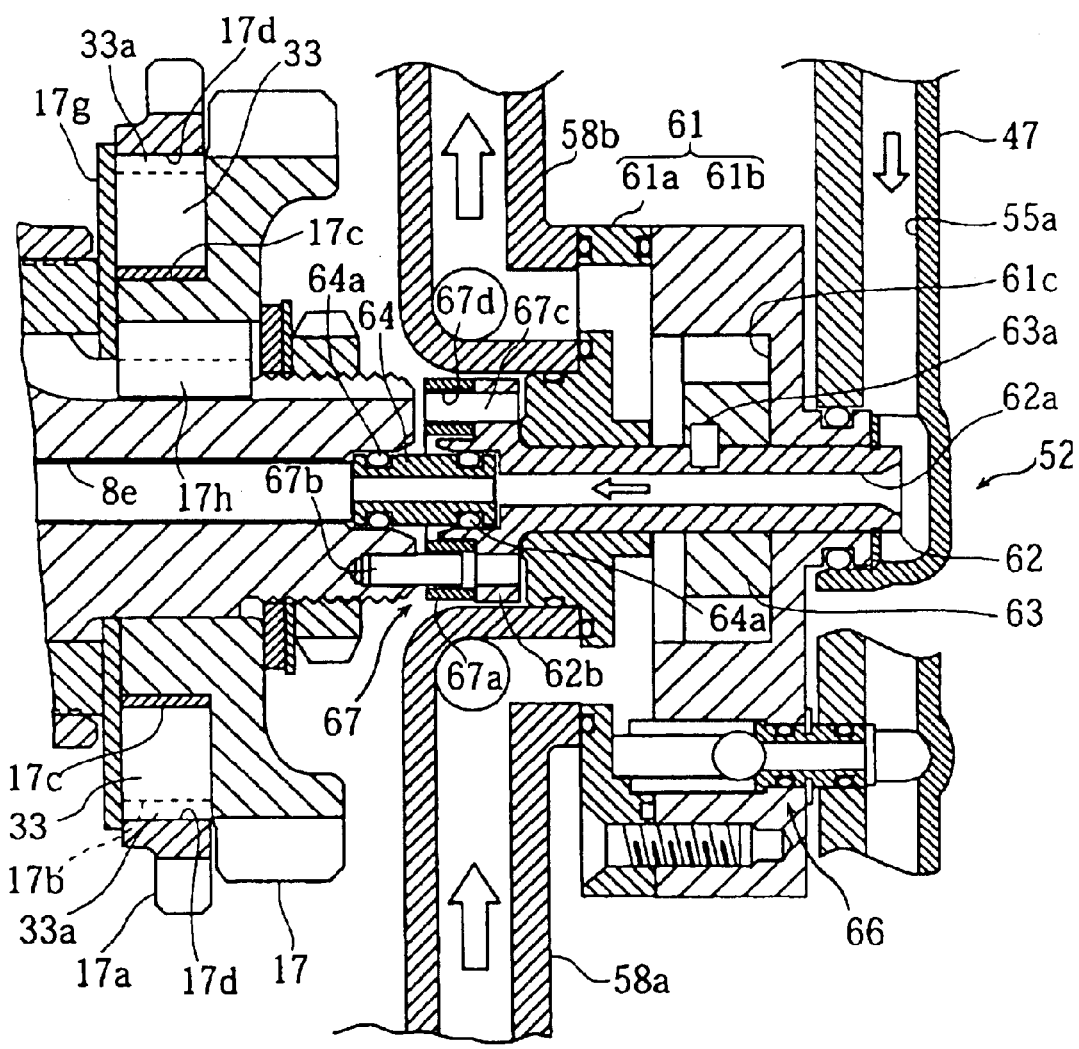
FIG. 20 is a cross-sectional side view showing surroundings of a lubricating oil pump of the lubricating device.
Figure 21:
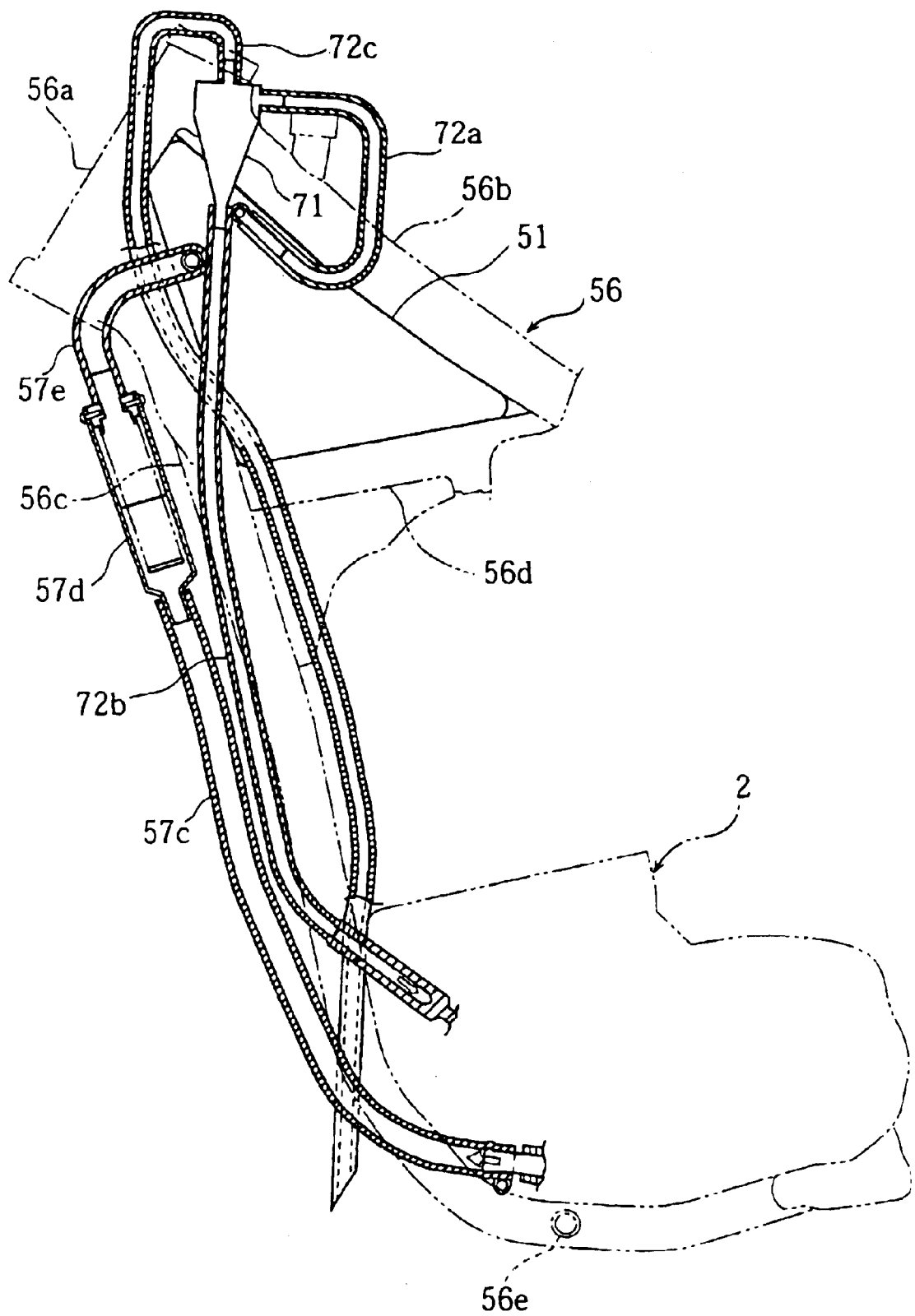
FIG. 21 is a cross sectional, left side view showing the lubricating device.

Also, an intermediate portion of the left transmission oil-feed passage 54b is communicated to a bolt hole 60a, into which a case bolt 60 coupling the left and right case portions 2a, 2b to each other is inserted. The bolt hole 60a comprises a hole having a somewhat larger inside diameter than an outside diameter of the case bolt 60 and formed in cylindrical-shaped boss portions 60c, 60c, which are formed on the left and right case portions 2a, 2b in a manner to face and abut against mating surfaces of the case portions. The boss portions 60c are positioned in the vicinity of meshing portions of gear trains on the main shaft 14 and the drive shaft 15, and formed with a plurality of branch holes 60b, through which a lubricating oil in the bolt hole 60a is jetted toward the meshing portions. In addition, while the bolt 60 shown in FIG. 19 is described with the left and right case portions developed, these indicate the same bolt.

Moreover, a right end of the bolt hole 60a is communicated to a drive-shaft hole 15a formed in an axial core of the drive shaft 15 via a communication hole 54c. The drive-shaft hole 15a is closed at its left portion by a partition wall 15c, and communicated to sliding portions of the drive shaft 15 and drive gears through a plurality of branch holes 15b. In this manner, a lubricating oil fed to the drive-shaft hole 15a is fed to the sliding portions through the branch holes 15b.

The crank lubricating system 55 is constructed in the following manner. Formed in the filter cover 47 is a crank oil-feed passage 55a extending toward the lubricating oil pump 52 from a crank-side outlet 59c, the passage 55a being communicated to a communication hole 62a formed through an axial core of a rotating shaft 62 of the lubricating oil pump 52, and the communication hole 62a is communicated via a connection pipe 64 to a crank oil-feed hole 8e formed in an axial core of the crankshaft 8. And the crank oil-feed hole 8e is communicated to a pin hole 65a of the crank pin 65 via a branch hole 8f, the pin hole 65a being opened through the branch hole 65b to rolling surfaces of a needle bearing 7b on the large end 7a of the conrod 7. In this manner, a lubricating oil having been filtered through the oil filter 59 is fed to the rolling surfaces of the needle bearing 7b.

The lubricating oil pump 52 is constructed in the following manner. A pump chamber 61c is recessed in a right casing 61b of a split-type casing 61 comprising left and right casings 61a, 61b, and a rotor 63 is rotatably arranged in the pump chamber 61c. The oil pump has an outline construction such that the rotating shaft 62 is inserted and arranged in an axial core of the rotor 63 to extend axially thereof, and the rotating shaft 62 and the rotor 63 are fixed to each other by means of a pin 63a. In addition, the oil suction passage 58a and the oil discharge passage 58b, respectively, are connected to upstream and downstream sides of the pump chamber in the left casing 61a. In addition, the reference numeral 66 denotes a relief valve for keeping a discharge pressure of the lubricating oil pump 52 to a predetermined value or lower, the relief valve permitting pressure on a discharge side of the lubricating oil pump 52 to escape toward the oil suction passage 58a when the pressure assumes the predetermined value or higher.

The rotating shaft 62 is cylindrical in shape to extend axially through the pump casing 61, and a right end of the shaft shown in the figure is opened to the crank oil-feed passage 55a. Also, a power transmission flange 62b is formed integral with a left end of the rotating shaft 62 shown in the figure. The flange 62b is opposed to a right end surface of the crankshaft 8, and the flange 62b and the crankshaft 8 are connected to each other such that an Oldham's coupling 67 can accommodate some off-centering therebetween.

More specifically, the Oldham's coupling 67 is constructed such that a coupling plate 67a is arranged between the crankshaft 8 and the flange 62b and a pin 67b implanted into an end surface of the crankshaft 8 and a pin 67c implanted into the flange 62b are inserted into connection holes 67d of the coupling plate 67a.

Also, the connection pipe 64 serves to communicate a right-end opening of the crankshaft 8 and a left-end opening of the rotating shaft 62 to each other, and oil seals 64a provide sealing between inner peripheries of the opening of the crankshaft and the opening of the rotating shaft and an outer periphery of the connection pipe 64.

Here, as described above, the crank chamber 2c is defined with the other transmission chamber 2d, flywheel-magneto chamber 9a, and the clutch chamber 10a, whereby an oil returning mechanism is constituted, in which a stroke of the piston 6 causes pressure in the crank chamber 2c to fluctuate between positive and negative and such pressure fluctuation causes the lubricating oil in the respective chambers to be returned to the lubricating oil tank 51.

More specifically, a discharge port 2g and a suction port 2h are formed on the crank chamber 2c. Arranged at the discharge port 2g is a discharge-port reed valve 69, which opens when pressure in the crank chamber is positive, and arranged at the suction port 2h is a suction-port reed valve 70, which opens when pressure in the crank chamber is negative.

And the discharge port 2g is communicated to the clutch chamber 10a via a communication hole 2i from the crank chamber 2c to be communicated to the transmission chamber 2d via a communication hole 2j from the clutch chamber 10a, and the transmission chamber 2d is further communicated to the flywheel-magneto chamber 9a via a communication hole 2k. Are turn port 2m formed in communication with the flywheel-magneto chamber 9a is communicated to the lubricating oil tank 51 via a length of return hose 57c, an oil strainer 57d, and a length of return hose 57e.

Here, a guide plate 2n is arranged at the return port 2m. The guide plate 2n decreases a gap a of the return port 2m between the guide plate and a bottom wall 2p and ensures a wide width b to thereby function to surely discharge the lubricating oil.

Also, connected to the lubricating oil tank 51 is an oil separation mechanism for separating an oil mist contained in an air in the tank with a centrifugal force to return the same to the crank chamber 2c. The oil separation mechanism is constructed such that an introduction hose 72a connected at one end thereof to a top of the lubricating oil tank 51 is connected at the other end thereof tangentially to an upper portion of a cone-shaped separation chamber 71 and a return hose 72b connected to a bottom of the separation chamber 71 is connected to the suction port 2h of the crank chamber 2c. In addition, the air, from which the oil mist has been separated, is discharged to the atmosphere via an exhaust hose 72c.

As described above, according to the embodiment, since the crank chamber 2c is made a substantially closed space so as to make pressure therein fluctuate upon up and down movements of the piston 6, and the lubricating oil having flown into the crank chamber 2c is fed to the lubricating oil tank 51 according to fluctuation of pressure in the crank chamber 2c it is possible to dispense with any exclusive oil-feed pump (scavenge pump), thus enabling achieving simplification in construction and reduction in cost.

Also, since the discharge-port reed valve (outflow-side check valve) 69 is arranged in the vicinity of a connection of the oil-feed passage of the crank chamber 2c to open when pressure in the crank chamber is increased and to close when pressure in the crank chamber is decreased, the lubricating oil in the crank chamber can be more surely fed to the lubricating oil tank 51.

Also, since a portion above an oil level in the lubricating oil tank 51 is connected to the crank chamber 2c via the return hoses 72a, 72b and the discharge-port reed valve (suction-side check valve) 70 is arranged in the vicinity of a connection of the return hose of the crank chamber 2c to open when pressure in the crank chamber 2c is decreased and to close when pressure in the crank chamber is increased, a necessary air is drawn into the crank chamber 2c when the piston ascends and pressure in the crank chamber 2c is increased when the piston descends, so that the lubricating oil in the crank chamber 2c can be more surely fed.

Incidentally, in the case where there is provided no path, through which an air from outside is supplied into the crank chamber, there is a fear that when sealing between a piston and a cylinder bore is high in level, pressure in a crank chamber becomes negative upon upward movement of a piston and becomes negative or positive in low level even when the piston descends, whereby oil feed is made impossible.

Moreover, since the centrifugal-type lubricating-oil mist separator 71 for separation of a lubricating-oil mist is provided midway the return passages 72a, 72b, the separated lubricating oil is returned to the crank chamber 2c via the return hose 72b, and an air, from which the mist content is separated, is discharged to the atmosphere, only the mist content of the lubricating oil can be returned into the crank chamber, so that it is possible to avoid that decrease in oil-feed efficiency, which is caused by flowing of excess air into the crank chamber, and to surely feed a lubricating oil in the crank chamber while preventing atmospheric pollution.

Also, since the lubricating oil pump 52 is arranged to be connected to one end of the crankshaft 8 and a discharge port of the lubricating oil pump 52 is communicated to the crank oil-feed hole (oil-feed passage in the crankshaft) 8e formed in the crankshaft 8 via the communication hole (oil-feed passage in the pump) 62a formed in the lubricating oil pump 52 and the connection pipe 64, a simple and compact construction makes it possible to feed a lubricating oil to sections being lubricated, of the crankshaft 8.

Also, since the crankshaft 8 and the lubricating oil pump 52 are connected to each other by the Oldham's coupling 67 capable of accommodating displacement in a direction perpendicular to the crankshaft, the communication hole 62a and the crank oil-feed hole 8e are connected to each other by the connection pipe 64, and the O-rings 64a having elasticity are interposed between the connection pipe 64 and the communication hole 62a and the crank oil-feed hole 8e, the lubricating oil can be fed to the sections being lubricated, without hindrance even when some off-centering is generated between the crankshaft 8 and the pump shaft 62, so that a necessary lubricating quality can be ensured.

Moreover, since the cylindrical-shaped boss portions 60c are formed in the vicinity of the main shaft 14 and the drive shaft 15, which constitute a transmission, the case bolt 60 for crankcase coupling is inserted into the bolt hole 60a thereof to have a space between the internal surface of the bolt hole 60a and the external surface of the case bolt 60 serving as a lubricating oil passage, and the branch holes (lubricating oil feed holes) 60b are formed in the boss portions 60c to be directed toward the transmission gears on the boss portions 60c, a lubricating oil can be fed to meshing surfaces of the transmission gears without the provision of exclusive lubricating oil feed passages.

Also, since the other end of the lubricating oil passage defined between the internal surface of the bolt hole 60c and the external surface of the case bolt 60 is communicated to the counter-output side opening of the drive-shaft hole (lubricating oil passage) 15a formed in the drive shaft 15, a lubricating oil can be fed to sliding portions of the transmission gears on the drive shaft 15 without the provision of exclusive lubricating oil feed passages.

Figure 22:
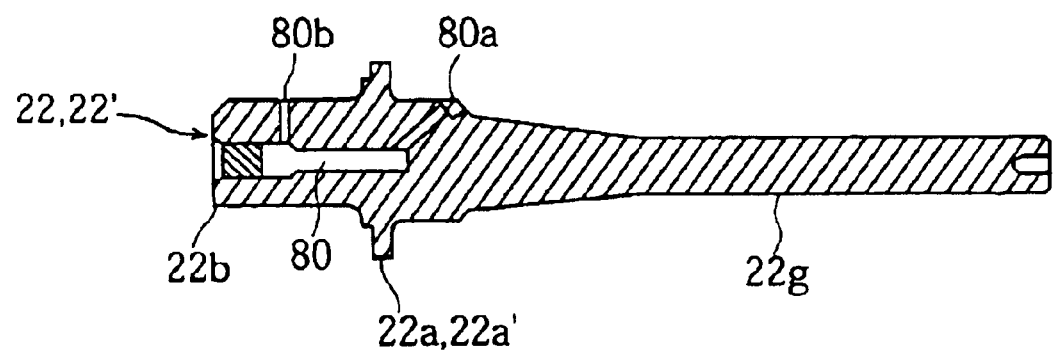
FIG. 22 is a cross sectional side view showing a balancer shaft for illustration of an embodiment of the invention of claim 7.

FIG. 22 is a view illustrating an embodiment of the invention of claim 7, in which a lubricating oil can be more surely fed to the balancer bearing 23. In the figure, the same reference numerals as those in FIG. 5 denote the same or corresponding elements.

In the embodiment, formed in balancer bearings 22, 22' is an oil introduction passage 80 to communicate the crank chamber 2c and mounts of the bearings 23 for the balancer weights 24, 24' to each other. An oil inlet 80a of the oil introduction passage 80 is opened to the crank chamber 2c, and an oil outlet 80b is opened toward the bearing 23.

Pulsation of pressure in the crank chamber 2c caused by reciprocation of the piston 6 causes a lubricating oil to be introduced into the oil introduction passage 80 from the oil inlet 80a and to be discharged from the oil outlet 80a. Thereby, the lubricating oil is surely fed to the bearings 23 to improve the lubricating quality of the bearings 23.

INDUSTRIAL APPLICABILITY

According to the invention of claim 1, since the first balancer weight is arranged on one end of the first balancer shaft in a direction along the crankshaft and the second balancer weight is arranged on the other end of the second balancer shaft in the direction along the crankshaft, two heavy balancer weights are arranged on both sides across the direction along the crankshaft to be made left-right symmetric whereby it is possible to avoid that worsening in weight balance in the direction along the crankshaft, which is caused in the case where a two-axis type balancer device is provided.

Also, since the first and second balancer shafts are made close to the crankshaft so that loci of rotation of the first and second balancer weights partially overlap a locus of rotation of that portion of the crankshaft, which is coupled to a conrod when viewed in the direction along the crankshaft, it is possible to avoid a problem that large-sizing around the crankcase is caused due to arrangement of balancer shafts away from a crankshaft, in the case where a two-axis type balancer device is provided.

According to the inventions of claims 2 and 5, since the first and second balancer weights are arranged to be close to and outside first and second journal bearings bearing both sides of that portion of the crankshaft, which is coupled to the conrod, a dimension in the direction along the crankshaft can be minimized, so that in the case where a two-axis type balancer device is provided, it is possible to avoid a problem that enlargement around the crankcase in the direction along the crankshaft is caused due to arrangement of balancer weights away from that portion of a crankshaft, which is coupled to a conrod, in a direction along the crankshaft.

According to the invention of claim 3, since the first and second balancer shafts serve as coupling bolts for a left and right split type crankcase, it is possible to enhance a crankcase in coupling rigidity while suppressing complication of a construction and an increase in the number of parts, in the case where a two-axis type balancer device is adopted. Also, since the balancer shafts serve as crankcase coupling bolts, it is possible to reduce a space, in which exclusive crankcase coupling bolts are arranged, and in this point it is possible to avoid large-sizing around the crankcase.

According to the invention of claim 4, since the first and second balancer shafts are made close to the crankshaft so that loci of rotation of the first and second balancer weights partially overlap a locus of rotation of that portion of the crankshaft, which is coupled to a conrod when viewed in the direction along the crankshaft, it is possible to more surely avoid that large-sizing around the crankcase, which is caused due to arrangement of balancer shafts away from a crankshaft, in the case where a two-axis type balancer device is provided.

According to the invention of claim 5, since the balancer weights and the balancer driven gears are made integral with each other and rotatably supported on the balancer shafts, it suffices to rotatingly drive only the balancer weights and the balancer driven gears and it is unnecessary to rotatingly drive the balancer shafts themselves, according to which it is possible to achieve making effective use of an engine output. Also, freedom in assembly can be improved as compared with a constitution, in which balancer weights and balancer shafts are united together.

According to the invention of claim 6, since the crankcase-interior portions of the first and second balancer shafts are formed to have a smaller diameter than that of the weight supports, it is possible to make the balancer shaft further close to the crankshaft, thus enabling more surely avoiding large-sizing around the crankcase.

According to the invention of claim 7, since oil introduction passages are formed on the first and second balancer shafts to communicate the crank chamber and balancer-weight bearing portions to each other, that pulsation of pressure in the crank chamber, which is caused by up and down movements of the piston, causes the lubricating oil to be surely fed to the balancer weight bearing portions.

According to the invention of claim 8, since axes of rotation of the drive gears are made eccentric from axes of the balancer shafts, a simple construction and a simple operation of rotating the balancer shafts make it possible to regulate backlash relating to the balancer gears and the drive gears on the crankshaft, thus enabling preventing generation of noise.

According to the invention of claim 9, since both backlash regulation mechanisms for the first and second balancer shafts are provided on the same side of the engine, a work for regulating backlash on the both balancer shafts can be regulated on one side of the engine, and the work is made easy.

According to the invention of claim 10, since the drive gears on a side of the crankshaft to mesh with the balancer gears comprise a ring-shaped gear portion arranged around a disk-shaped base portion fixed to the crankshaft to be rotatable relative thereto and having teeth to mesh with the balancer gears, and U-shaped buffer springs interposed between the gear portion and the base portion, such compact construction absorbs shocks caused by torque nonuniformity of the engine or the like to be able to smoothly actuate the balancer device.

What is claimed is:

1. A balancer device for engines, in which first and second balancer shafts are arranged in parallel to a crankshaft and the crankshaft rotatingly drives first and second balancer weights at the same speed as that of the crankshaft, characterized in that the, first balancer weight is arranged on one end of the first balancer shaft in a direction along the crankshaft, the second balancer weight is arranged on the other end of the second balancer shaft in the direction along the crankshaft, and the first and second balancer shafts are made close to the crankshaft so that loci of rotation of the first and second balancer weights partially overlap a locus of rotation of that portion of the crankshaft, which is coupled to a conrod when viewed in the direction along the crankshaft, wherein both sides of that portion of the crankshaft, which is coupled to the conrod, are born through first and second journal bearings by side walls of a crank chamber, the first and second balancer weights are rotatable supported by the first and second balancer shafts, and balancer driven sears formed on the first and second balancer weights mesh with crank drive gears, which are arranged close to and outside the first and second journal bearings.

2. A balancer device for engines, in which first and second balancer shafts are arranged in parallel to a crankshaft and the crankshaft rotatingly drives first and second balancer weights at the same speed as that of the crankshaft, characterized in that the first and second balancer shafts serve as coupling bolts for a left and right split type crankcase, and the first and second balancer weights are rotatably supported by the first and second balancer shafts.

3. The balancer device for engines, according to claim 2, wherein the first balancer weight is arranged on one end of the first balancer shaft in a direction along the crankshaft, the second balancer weight is arranged on the other end of the second balancer shaft in the direction along the crankshaft, and the first and second balancer shafts are made close to the crankshaft so that loci of rotation of the first and second balancer weights partially overlap a locus of rotation of that portion of the crankshaft, which is coupled to a conrod when viewed in the direction along the crankshaft.

4. The balancer device for engines, according to claim 3, wherein both sides of that portion of the crankshaft, which is coupled to the conrod, are born through first and second journal bearings by side walls of a crank chamber, and balancer driven gears formed on the first and second balancer weights mesh with crank drive gears, which are arranged close to and outside the first and second journal bearings.

5. The balancer device for engines, according to claim 4, wherein the first and second balancer shafts comprise weight supports for supporting the first and second balancer weights, and crankcase-interior portions arranged adjacent to the crankshaft, the crankcase-interior portions being formed to have a smaller diameter than that of the weight supports.

6. The balancer device for engines, according to claim 4 or 5, wherein oil introduction passages are informed on the first and second balancer shafts to communicate the crank chamber and balancer-weight bearing portions to each other.

7. The balancer device for engines, according to claim 6, wherein axes of rotation of the first and second balancer driven gears are made eccentric from axes of the first and second balancer shafts, and first and second balancer shafts are rotated to thereby enable regulating backlash between the first and second balancer driven gears and the first and second crank drive gears.

8. The balancer device for engines, according to claim 7, further comprising backlash regulation mechanisms provided on the same end sides of the first and second balancer shafts in the direction along the crankshaft.

9. The balancer device for engines, according to claim 8, wherein the first and second crank drive gears comprise a ring-shaped gear portion arranged around a disk-shaped base portion fixed to the crankshaft to be rotatable relative thereto and having teeth to mesh with the balancer driven gears, and U-shaped buffer springs interposed between the gear portion and the base portion.

* * * * *